US012718015B2

(12) United States Patent
Howell et al.

(10) Patent No.: US 12,718,015 B2
(45) Date of Patent: Aug. 25, 2026

(54) DOMAIN ADAPTATION OF AI NLP ENCODERS WITH KNOWLEDGE DISTILLATION

(71) Applicant: LIVEPERSON, INC., New York, NY (US)

(72) Inventors: Kristen Howell, New York, NY (US); Jian Wang, Gainesville, FL (US); Matthew Dunn, Arlington, MA (US); Joseph Bradley, Seattle, WA (US)

(73) Assignee: LIVEPERSON, INC., New York, NY (US)

( * ) Notice: Subject to any disclaimer, the term of this patent is extended or adjusted under 35 U.S.C. 154(b) by 246 days.

(21) Appl. No.: 18/731,675

(22) Filed: Jun. 3, 2024

(65) Prior Publication Data

US 2025/0005280 A1 Jan. 2, 2025

Related U.S. Application Data

(63) Continuation of application No. 18/088,047, filed on Dec. 23, 2022, now Pat. No. 12,039,269, which is a continuation of application No. 17/711,556, filed on Apr. 1, 2022, now Pat. No. 11,568,141.

(60) Provisional application No. 63/170,240, filed on Apr. 2, 2021.

(51) Int. Cl.

*G06F 40/279* (2020.01)
*G06F 16/3331* (2025.01)
*G06F 18/214* (2023.01)
*G06F 40/30* (2020.01)

(52) U.S. Cl.

CPC ........ *G06F 40/279* (2020.01); *G06F 16/3331* (2019.01); *G06F 18/2155* (2023.01); *G06F 40/30* (2020.01)

(58) Field of Classification Search

CPC ............. G06F 16/3331; G06F 18/2155; G06F 40/279; G06F 40/30

See application file for complete search history.

(56) References Cited

U.S. PATENT DOCUMENTS

| | | | | |
|---|---|---|---|---|
| 11,068,786 | B1 * | 7/2021 | Liu | G06N 3/0464 |
| 11,907,672 | B2 * | 2/2024 | Nugent | G06N 3/0499 |
| 2016/0358070 | A1 * | 12/2016 | Brothers | G06N 3/045 |
| 2021/0109991 | A1 * | 4/2021 | Wang | G06N 3/0895 |

* cited by examiner

*Primary Examiner* — Eric Yen

(74) *Attorney, Agent, or Firm* — POLSINELLI LLP

(57) ABSTRACT

Systems, methods, devices, instructions, and other examples are described for natural language processing. One example includes accessing natural language processing general encoder data, where the encoder data is generated from a general-domain dataset that is not domain specific. A domain specific dataset is accessed and filtered encoder data using a subset of the encoder data is generated. The filtered encoder data is trained using the domain specific dataset to generate distilled encoder data, and tuning values for the distilled encoder data are generated to configure task outputs associated with the domain specific dataset.

20 Claims, 16 Drawing Sheets

APPLICATION LAYER
414

PRESENTATION LAYER
412

SESSION LAYER
410

TRANSPORT LAYER
408

NETWORK LAYER
406

LINK LAYER
404

PHYSICAL LAYER
402

APP-RUNNING DEVICE (NETWORK DEVICE, GATEWAY, SERVER)
428

INTERNETWORK CONNECTION
426

INTRANETWORK CONNECTION
424

INTRANETWORK CONNECTION (HUB)
422

CONNECTION MANAGEMENT SYSTEM
450

ACCESSING DISTILLED ENCODER DATA, WHEREIN THE DISTILLED ENCODER DATA IS GENERATED BY FILTERING ENCODER DATA GENERATED FROM A GENERAL-DOMAIN DATASET THAT IS NOT DOMAIN SPECIFIC TO GENERATE FILTERED ENCODER DATA, AND GENERATING THE DISTILLED ENCODER DATA FROM THE FILTERED ENCODER DATA USING A DOMAIN SPECIFIC TRAINING DATASET;
1102

ACCESSING A REAL-TIME STREAM OF DOMAIN SPECIFIC DATA
1104

PROCESSING THE REAL-TIME STREAM OF DOMAIN SPECIFIC DATA USING THE DISTILLED ENCODER DATA TO GENERATE TASK OUTPUT DATA
1106

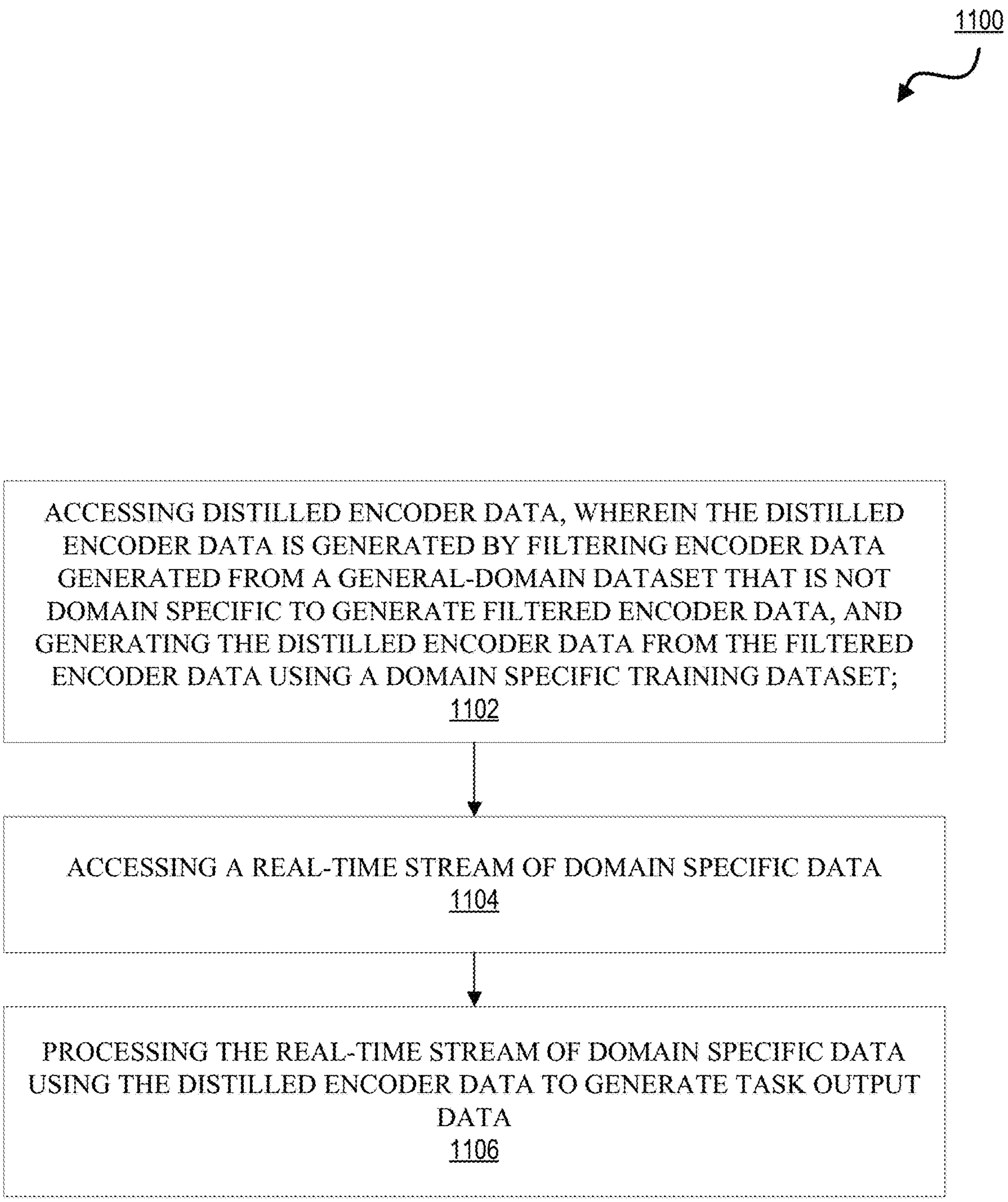

FIG. 11

DOMAIN ADAPTATION OF AI NLP ENCODERS WITH KNOWLEDGE DISTILLATION

CROSS-REFERENCE TO RELATED APPLICATIONS

This application is a continuation of U.S. patent application Ser. No. 18/088,047 filed Dec. 23, 2022, which is a continuation of U.S. patent application Ser. No. 17/711,556 filed Apr. 1, 2022, which claims the priority benefit of U.S. provisional patent application No. 63/170,240 filed Apr. 2, 2021, the disclosures of which are incorporated by reference herein.

FIELD

The present disclosure relates generally to communication and language processing using artificial-intelligence (AI).

BACKGROUND

Network-based communication allow for complex server-based systems to provide access to complex artificial-intelligence (AI) and natural language processing (NLP) systems. AI and NLP systems can be used with contextual language models to create complex systems that can respond to a wide variety of inputs. Creation of such systems and encoders which are used to analyze natural language queries input to such systems involves training using large amounts of data, and such creation and training can consume large amounts of energy and significant computing resources.

SUMMARY

Machine learning techniques for natural language processing (NLP) are used to process data streams in a wide variety of circumstances. Bidirectional encoder representations from transformers (BERT) and embeddings from language models (ELMo) are examples of techniques used as a basis for a number of different models implemented to perform NLP tasks, such as predicting future text from a received string of text or assigning a string of text to a category. Aspects described herein include techniques, systems, methods, instructions, and other embodiments provided to adapt an AI natural language processing (NLP) contextual language model to a specific domain, and deployment of the adapted model to applications associated with specific domain. The encoders are used to identify and analyze natural language queries, and to improved performance of a communication system with an AI platform associated with the queries.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Aspects described herein relate to such language models and communication systems configured to use data from language models to improve communication system operations. Such communication systems can include systems configured to respond to a wide variety of user inquiries, either by human agents or automated machine agents that respond using AI systems. General language models increasingly use larger and larger amounts of resources, such that an implementation of a general language model created for the highest possible performance can outstrip the resources available for many practical environments. Distillation as described herein refers to operations used to reduce the implementation size of a general language model. Examples described herein apply distillation to general encoders and then use domain specific context datasets to distill a general language model into a smaller language model that provides performance similar to the performance of the general language model but targeted to a particular language domain. The distillation allows an encoder with a smaller resource footprint and improved performance for within a context associated with a given domain. For example, a specific domain (e.g., cloud computing, cellular biology, astrophysics, baseball, ice hockey, stock trading, Olympic sports, product technical support, etc.) can use uncommon definitions for words and context specific jargon. Distilling a general language model with domain specific data can both reduce the size of a model that performs in contexts associated with a specific domain. Additionally, some domains may have common misspellings which can be identified by domain specific distillation. Examples described herein can improve the operation of communication systems and devices in communication systems with AI language models with a smaller footprint (e.g., smaller memory use) than general models, and with comparable or improved performance within a given domain.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended Figures:

FIG. 11 shows a flowchart of a method embodiment in accordance with some aspects of the present technology;

Figure 1A:
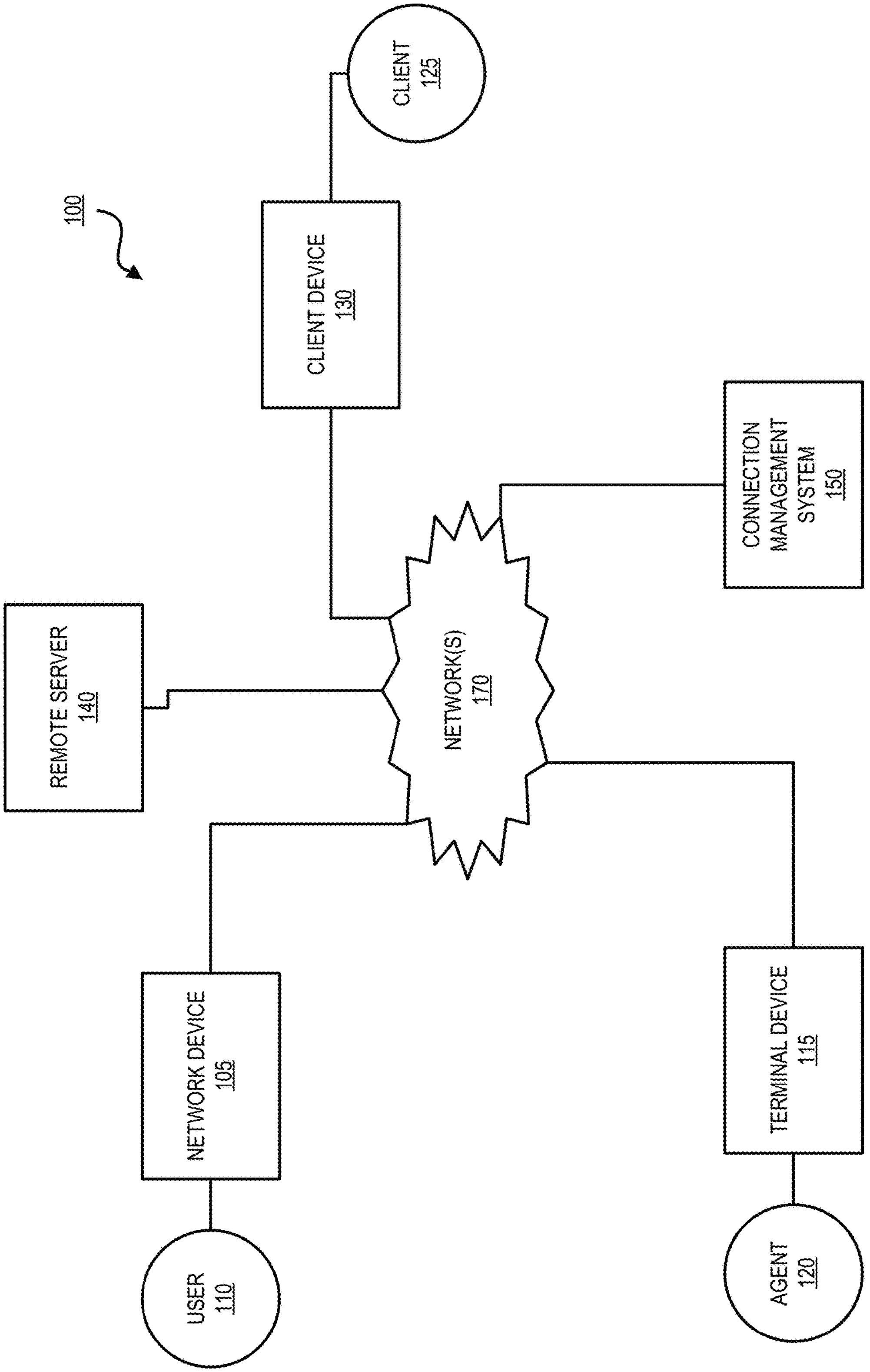
FIG. 1A shows an example embodiment of a network interaction system for use with a domain specific NLP encoder in accordance with some aspects of the present technology.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples and is not intended to limit the scope, applicability or configuration of the disclosure. Rather, the ensuing description of the examples will provide those skilled in the art with an enabling description for implementing examples. It is understood that various changes can be made in the function and arrangement of elements without departing from the spirit and scope as set forth in the appended claims.

Examples described herein relate to communication systems configured to provide information to users with artificial intelligence (AI), natural language processing (NLP) and machine analysis driven systems. Examples herein also relate to systems and methods for generating encoders used in language engines (e.g., for NLP) in such communication systems. Communication systems configured to provide information to a requestor from system resources (e.g., AI or human agents) can use NLP and AI systems in a variety of was to facilitate information transfer. Such systems can, for example, use natural language processing (NLP), natural language analysis (NLA), neural networks, and various AI and machine learning tools to analyze and improve communications system by improving message routing and responses to a message. Such systems can be configured to respond to a wide variety of user inquiries associated with a wide variety of topics or circumstances (e.g., different domains).

Natural language processing (NLP) systems can be used for real-time automated handling of such inquiries. Bidirectional encoder representations from transformers (BERT) and embeddings from language models (ELMo) are examples of techniques used as a basis for a number of different models implemented as NLP systems to perform NLP tasks.

Examples described herein provide improved NLP systems for context specific applications of NLP systems. In one example, a distilled encoder for NLP improves the operation of communication systems and devices in a communication system by providing improved NLP performance in context (e.g., domain) limited environments, while using fewer resources (e.g., memory and processing resources) than general NLP systems adapted for general (e.g., not domain or context specific) language processing. In one example, such a distilled encoder is generated from a general NLP encoder (e.g., a general BERT encoder) by filtering the layers of the general NLP encoder to generate filtered encoder data. The filtering can remove layers or selected groups of data from the network that makes up the general NLP encoder. The filtering is not targeted to produce a functioning encoder after the filtering, and given the nature of complex machine networks such as a general NLP encoder that is created by training with general data, the filtering can result in a filtered encoder that is has unhelpful or low quality results. The filtered encoder does, however, retain sufficient information from the general encoder that additional training can produce performance in a distilled encoder (e.g., a trained version of the filtered encoder) that is similar to the performance of the general encoder with a significantly smaller memory size (e.g., smaller memory resource usage or memory footprint in an implemented encoder. The performance can particularly be maintained in the reduced memory footprint by limiting the training data and the performance criteria to a specific information domain. While the general encoder will perform better in a general context (e.g., managing general search queries), the distilled encoder can provide similar performance within the distilled encoder's specified domain (e.g., search queries or other text phrases limited to or strongly correlated with the defined domain or context).

Distilled encoder data generated as described above can then be used in domain specific applications of a communication system. For example, a specific domain used to create a distilled encoder can be technical support for a device. An initial text input to a communication system configured to provide technical support can use the distilled encoder with tuning to determine an intent for the initial text input from a set of intent values (e.g., returns, repairs, operation instructions, general questions, etc.) The distilled encoder can use domain-specific language, including terms specific to the device, common typos or errors associated with the device or technical support, or other such understanding of domain specific language to identify an intent of the initial text input. Another implementation may be identifying sub-topics within a domain that are associated with a communication. For example, if a domain for a system is computer programming, a distilled encoder with tuning can be configured to identify topics associated with a communication, such as programming languages (e.g., C, Java, Python, etc.) or computing platforms (e.g., Android, Windows, etc.) Particularly where domain specific language may have different meanings that the meaning of the same word in a general domain (e.g., Java programming compared with java as a term for coffee, or Python programming compared with python as a type of snake), a distilled encoder can not only have a smaller footprint, but can provide superior natural language understanding (NLU) results than a general encoder due to the domain specific focus of the distilled encoder.

The description below provides details of computing and communication systems in which domain specific distilled encoders can be used to perform context specific NLP operations, as well as examples of distilled encoders and the generation of such encoders.

FIG. 1A shows a block diagram of an embodiment of a network interaction system 100 which implements and supports certain embodiments and features described herein. Certain embodiments relate to using distilled NLP encoders to process data streams from connections between a network device 105 (which can be operated by a user 110), and a terminal device 115 (which can be operated by an agent 120) and/or a client device 130 (operated by a client 125). As mentioned above, NLP can be used at many different points in such a communication system to improve or automate routing of requests and associated informational responses.

In some embodiments, a user 110 can be an individual browsing a web site or accessing an online service provided by a remote server 140. In some embodiments, user 110 can be an individual looking to have a service performed on their behalf. Such a service can include having a question answered, operating another device, getting help from an agent with a task or service, conducting a transaction, etc.

A client 125 can be an entity that provides, operates, or runs the website or the online service, or individuals employed by or assigned by such an entity to perform the tasks available to a client 125 as described herein.

The agent 120 can be an individual, such as a support agent or sales associate tasked with providing support or information to the user 110 regarding the website or online service (e.g., information about products available at an online store). Distilled NLP encoders can be implemented to assist human agents by filtering or processing information to suggest actions, limit options, provide data, or support the actions of the agents in any way within a communication system. Out of a large number of agents, a subset of agents (e.g., agents associated with a particular domain or context) may be appropriate for providing support or information for a particular client 125. The agent 120 may be affiliated or not affiliated with the client 125. Agents associated with a particular domain or client can have various engines that include distilled NLP encoders for the agent's particular domain. Each agent can be associated with one or more clients 125. When an agent is associated with multiple domains, the agent may have different assistance engines with distilled NLP encoders for the different domains. In some non-limiting examples, a user 110 can be an individual shopping an online store from a personal computing device, a client 125 can be a company that sells products online, and an agent 120 can be a sales associate employed by the company. In such an example, the agent may use assistance engines with distilled NLP encoders to perform tasks in a sales domain, a company or product domain, or any other such domain associated with the context in which the sales associate provides information to the customer. In various embodiments, the user 110, client 125, and agent 120 can be other individuals or entities.

While FIG. 1A shows only a single network device 105, terminal device 115, and client device 130, an interaction system 100 can include multiple or many (e.g., tens, hundreds or thousands) of each of one or more of these types of devices. Similarly, while FIG. 1A shows only a single user 110, agent 120, and client 125, an interaction system 100 can include multiple or many of each of one or more of such entities. Each entity or groups of entities in such a system can be associated with a different information domain or context that can be used in distilling an encoder for an NLP system for the entity, to enable an efficient NLP system for tasks specific to a given entity or group of entities in the given information domain.

A connection management system 150 can facilitate strategic routing of communications between entities in the system. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some embodiments, connection management system 150 routes the entire communication to another device. In some embodiments, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connections between network device 105 and one or more terminal devices 115. For example, upon receiving a communication from network device 105, connection management system 150 can estimate to which client (if any) the communication corresponds. Upon identifying a client, connection management system 150 can identify a terminal device 115 associated with the client for communication with network device 105. In some embodiments, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message.

In some embodiments, connection management system 150 can determine whether any connections are established between network device 105 and an endpoint associated with the client (or remote server 140) and, if so, whether such channels are to be used to exchange a series of communications including the communication.

Upon selecting an endpoint to communicate with network device 105, connection management system 150 can establish connections between the network device 105 and the endpoint. In some embodiments, connection management system 150 can transmit a message to the selected endpoint. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In some embodiments, communications between network device 105 and any endpoint (e.g., terminal device 115, remote server 140, client device 130, etc.) can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. Additionally, in some examples, connection management system 150 can be aware of the domain associated with different communications, and can manage filtering or sorting data for such domains in real time to improve the domain-specific datasets used for a distilled encoder. By using system information to continually update domain datasets, the distilled encoders can be improved over time. Similarly, if a new domain is identified without sufficient training data identified to distill an encoder, the connection management system 150 can identify data associated with a newly identified domain, and gather information to be used in training of a domain-specific encoder while a general encoder is used for NLP. When sufficient training data is gathered, examples described herein can be used for generating a distilled encoder. In some examples, the size of a dataset needed for effective domain specific training is small (e.g., less than 3 gigabits, less than 5 gigabits, etc., depending on patterns within the domain data) compared to the general dataset (e.g., less than 10% of the general dataset size, or other comparable differences depending on the domain patterns) used to generate a general encoder for NLP.

In some embodiments, connection management system 150 can monitor the communication exchange in real-time and perform automated actions (e.g., rule-based actions, artificial intelligence originated actions, etc.) based on the live communications. For example, when connection management system 150 determines that a communication relates to a particular product, connection management system 150 can automatically transmit an additional message to the endpoint containing additional information about the product (e.g., quantity of products in stock, links to support documents related to the product, or other information about the product or similar products).

In some embodiments, a designated endpoint can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some embodiments, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), extended TEA (XTEA), Corrected Block TEA (XXTEA), and/or RC5, etc.

A network device 105, terminal device 115, and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal, IoT and client devices or may be part of one or more such devices (e.g., via installation of an application on a device). Remote server 140 may be separately housed from each device and connection management system 150 and/or may be part of another device or system. While each device, server and system in FIG. 1A is shown as a single device, it will be appreciated that multiple devices may instead be used. For example, a set of network devices can be used to transmit various communications from a single user, or remote server 140 may include a server stack. As described herein, any such device (e.g., network device 105, terminal device 115, and/or client device 130, etc.) can implement AI engines using distilled encoders to perform domain specific tasks. Distilled encoders reduce resource usage (e.g., with a smaller memory footprint) and improve language processing performance when trained for a specific context (e.g., a specific information domain).

Figure 1B:
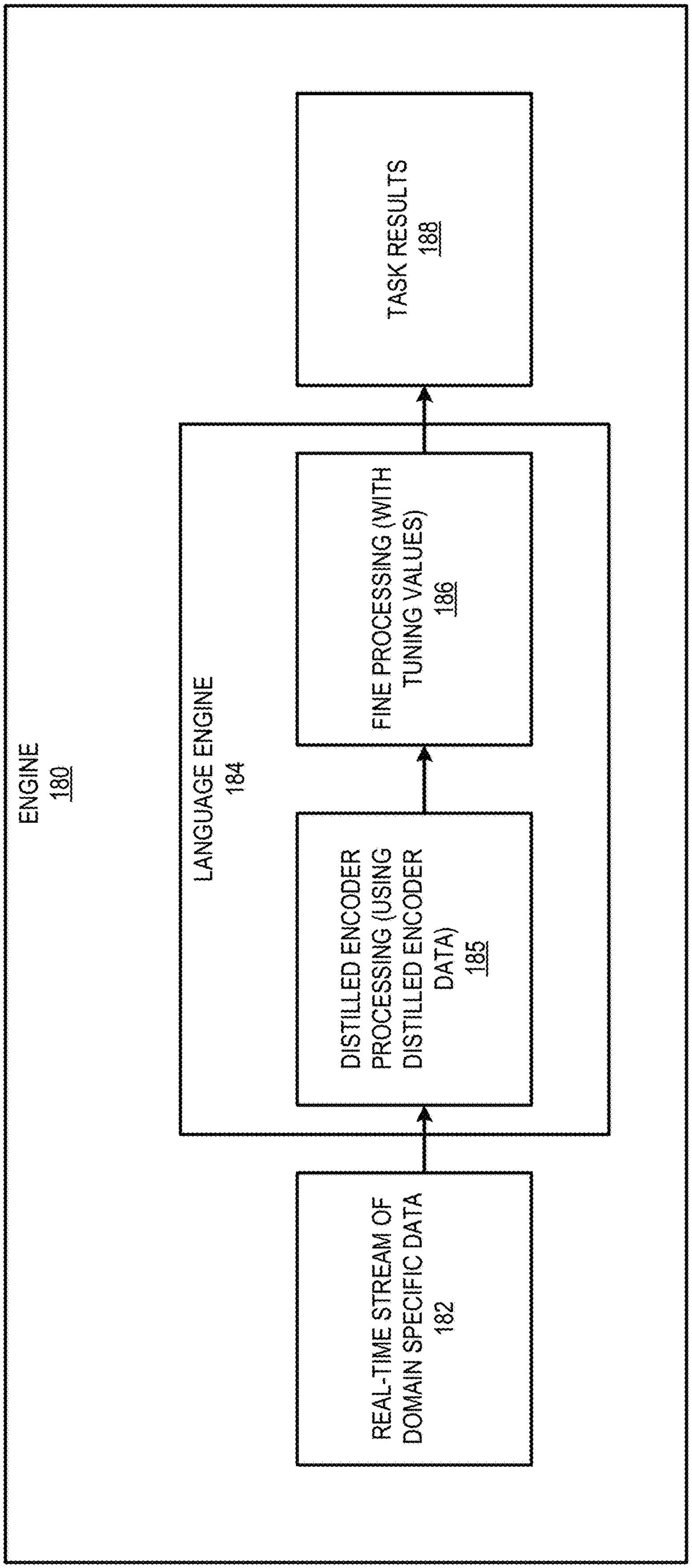
FIG. 1B illustrates aspects of a NLP implementation using distilled encoder processing in accordance with some aspects of the present technology.
Figure 1C:
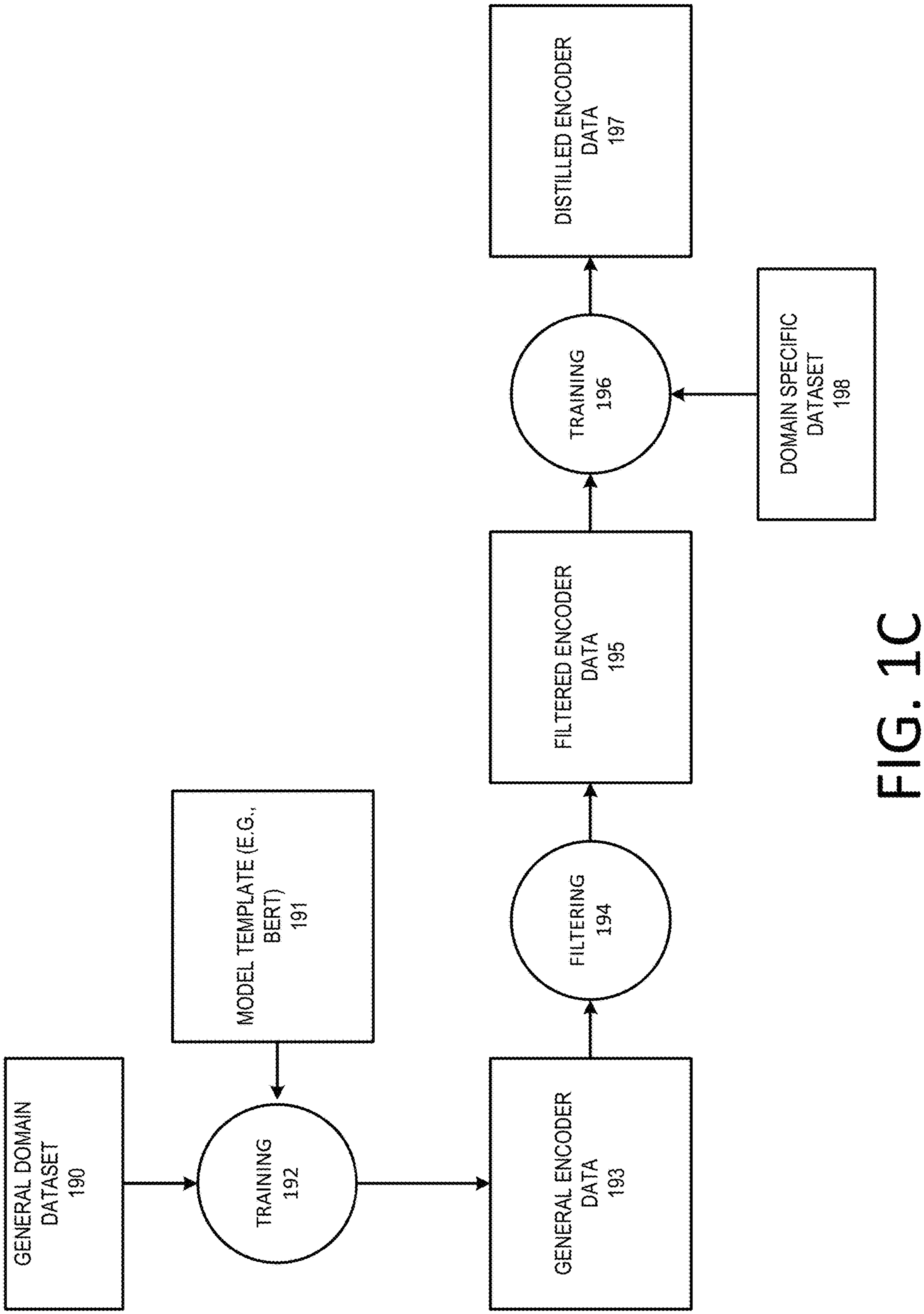
FIG. 1C illustrates aspects of encoder processing data that can be used to generate distilled encoder processing data in accordance with some aspects.

FIG. 1B illustrates aspects of an NLP implementation using distilled encoder processing in accordance with some aspects of the present technology. FIG. 1C illustrates a method of generating a distilled encoder for use in distilled encoder processing as illustrated in FIG. 1B. Engine 180 of FIG. 1B can be an AI engine implemented in any device of interaction system 100 that is configured to perform domain-specific tasks. As described above, high-performance NLP systems are currently often trained on large general datasets, such as data from Wikipedia™, CommonCrawl™, or other large general collections of text. Some contexts (e.g., domains or information domains), however, are not well represented in such "general" datasets. Examples of such contexts include context specific idioms not strongly represented in general datasets, as well as other broader information domains such as conversational commerce (e.g., customer service in a particular business domain), technical discussions in a given information domain, or other such contexts. When implemented in an engine 180, a language engine 184 for NLP receives a real-time stream of domain specific data 182. The real-time stream of data 182 is processed by distilled encoder processing 185, made up of distilled encoder data (e.g., a distilled neural network structure trained with context specific data). The output of the distilled encoder processing 185 is input to a fine processing 186 (e.g., a system layer), which is configured with tuning values to manage task performance. The fine processing 186 outputs task results 188 which are a result for the specific use that engine 180 is applied to. For example, engine 180 can be applied to a sorting task to decide a context specific sub-category (e.g., a specific product) in a given information domain (e.g., product support for a company with multiple products). Other such tasks can be determining a communication intent from a predefined set of intents (e.g., appointment scheduling, technical support, sales support, etc.)

Processing real-time flows of information in a given context using a general language encoder for NLP is both inefficient due to the large size of a generally trained encoder, and inefficient for not being customized to context specific language. Such high performance general NLP encoders have a large size due to large numbers of layers and parameters from training on general datasets. While such tasks can be handled by a general encoder, examples described herein improve system and device performance with smaller encoders that provide context (e.g., domain) specific performance enhancement. The resulting distilled encoder is a smaller model specific to a single domain that outperforms a model trained on general-domain data without distilling. The provided improvement in performance for the distilled encoder over the general encoder holds with limited domain specific training data for a filtered encoder generated from a general encoder as described below for FIG. 1C.

FIG. 1C illustrates aspects of encoder processing data that can be used to generate distilled encoder processing data in accordance with some aspects. Blocks 190 and 191 include initial data used for the general encoder. The general domain dataset of block 190 can be, as described above, general language data from any source. The model template of block 191 can be a specific implementation of a BERT, such as ROBERTa, or any other such specific implementation of the BERT model. In block 192, the model template of block 191 is trained using the general domain dataset of block 190 to generate general encoder data in block 193. The general encoder data of block 193 is a functioning encoder that can be used to perform NLP on any message, but due to the likely size of the general encoder data, such implementations have limited practical use, particularly for devices such as network device 105 or terminal device 115 which are likely to be personal computers or mobile devices (as compared with larger server systems). Even for large server systems, the implementations can be limited due to the resources consumed by large general encoders. In order to create a smaller and more portable encoder, filtering is performed in block 194. The filtering can take the general encoder data of block 193 with information about the structure of the model template from block 191 used to remove data from the general encoder data. The data is not removed based on the content of the data, (e.g., attempting to remove certain information from the data), but is removed based on the structure of the model used to create the general encoder data. The filtering can involve removal of layers in the encoder data template pattern, removal of certain parameter structures, or other such simplification to shrink the footprint of the general encoder data. The filtering, however, maintains some structure of the template, and thereby maintains patterns from the training in block 193. In one example, an initial and final layer are left in place, and every other internal layer of the general encoder data is removed, with internal data connections within the network reattached to the remaining layers. For example, in a network of general encoder data with 25 layers, labeled 1-25, all even numbered layers could be removed, and the remaining layers modified to maintain a functioning network. Additional details of such filtering are described below with respect to FIGS. 8 and 9.

While the filtered encoder data of block 195 is a functioning network (e.g., capable of producing outputs based on input data), the filtering operation of block 194 does not maintain all of the integrity of the training of block 192. Experimentation has been used to determine, however, that certain structures remain within a network that is not over-filtered (e.g., by removing more than a critical amount of the internal structure of the general encoder data), when trained with domain specific data, provides improved NLP performance over a BERT structure trained only with the domain specific data. In examples, domain specific training sets of 2 gigabits in size approached peak performance, and domain specific datasets achieved peak performance at 3 gigabits when used to train filtered data generated from approximately 222 gigabytes of general data. The domain specific dataset of block 198 used in the training of block 196 can be accessed from a variety of different sources. In some examples, the domain specific dataset is history data from real-time communications in a system such as network interaction system 100 which are limited to a particular domain. In other examples, a domain specific dataset can be gathered from information source limited to a given domain, such as technical articles in an information domain, or an archive of communications and/or data (e.g., articles, papers, or discussions) associated with a given domain.

The training of block 196 using the domain specific dataset of block 198 results in distilled encoder data in block 197. The distilled encoder data can then be paired with fine processing values as illustrated in FIG. 1B to create a practical implementation of a language engine 184 to perform an AI language processing task. The distilled encoder data can, for example, be applied to the real-time stream of domain specific data 182 for distilled encoder processing 185. The output of the processing 185 (e.g., processing real-time data using the distilled encoder data of block 197) is then further processed with fine processing 186 (e.g., using fine tuning values in a tuning network) to provide task results 188. Such a language engine 184 performing distilled encoder processing 185 using distilled encoder data generated in accordance with FIG. 1C provides improved device performance with domain specific performance from training with a limited size domain specific dataset, while having both a limited size (e.g., 40-60% smaller than an associated general encoder based engine) with more efficient resource usage in conjunction with the improved domain specific performance.

A language engine 184 can be implemented in a software agent or application, and may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data. Datasets can thus be collected throughout a system and used to update or improve language engines such as language engine 184. For example, data from a client device 130, a remote server 140, a connection management system 150, a network device 105, and a terminal device can be shared as part of a domain specific network interaction system 100, with the data collected throughout system 100 used to generate and update the domain specific dataset used for distilled encoder data for the dataset.

Figure 2:
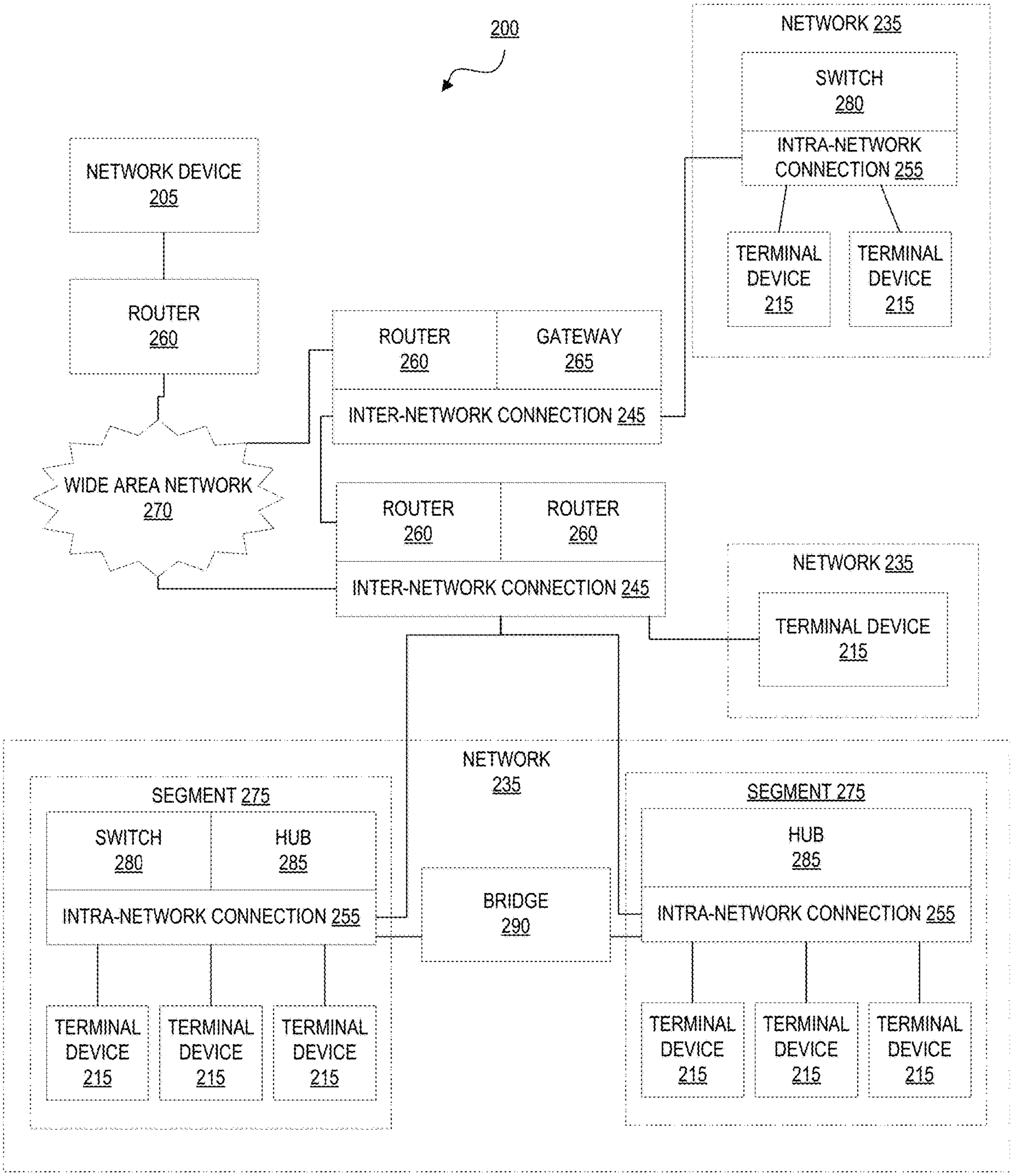
FIG. 2 shows an example embodiment of a network interaction system for use with a domain specific NLP encoder in accordance with some aspects of the present technology.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some embodiments, a communication from network device 205 includes destination data (e.g., a destination IP address) that at least partly or entirely indicates which terminal device is to receive the communication. Network interaction system 200 can include one or more inter-network connection components and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some embodiments, a local-area network 235 can be divided into multiple segments, each of which can be associated with independent firewalls, security rules and network protocols. An intra-network connection component 255 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some embodiments, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
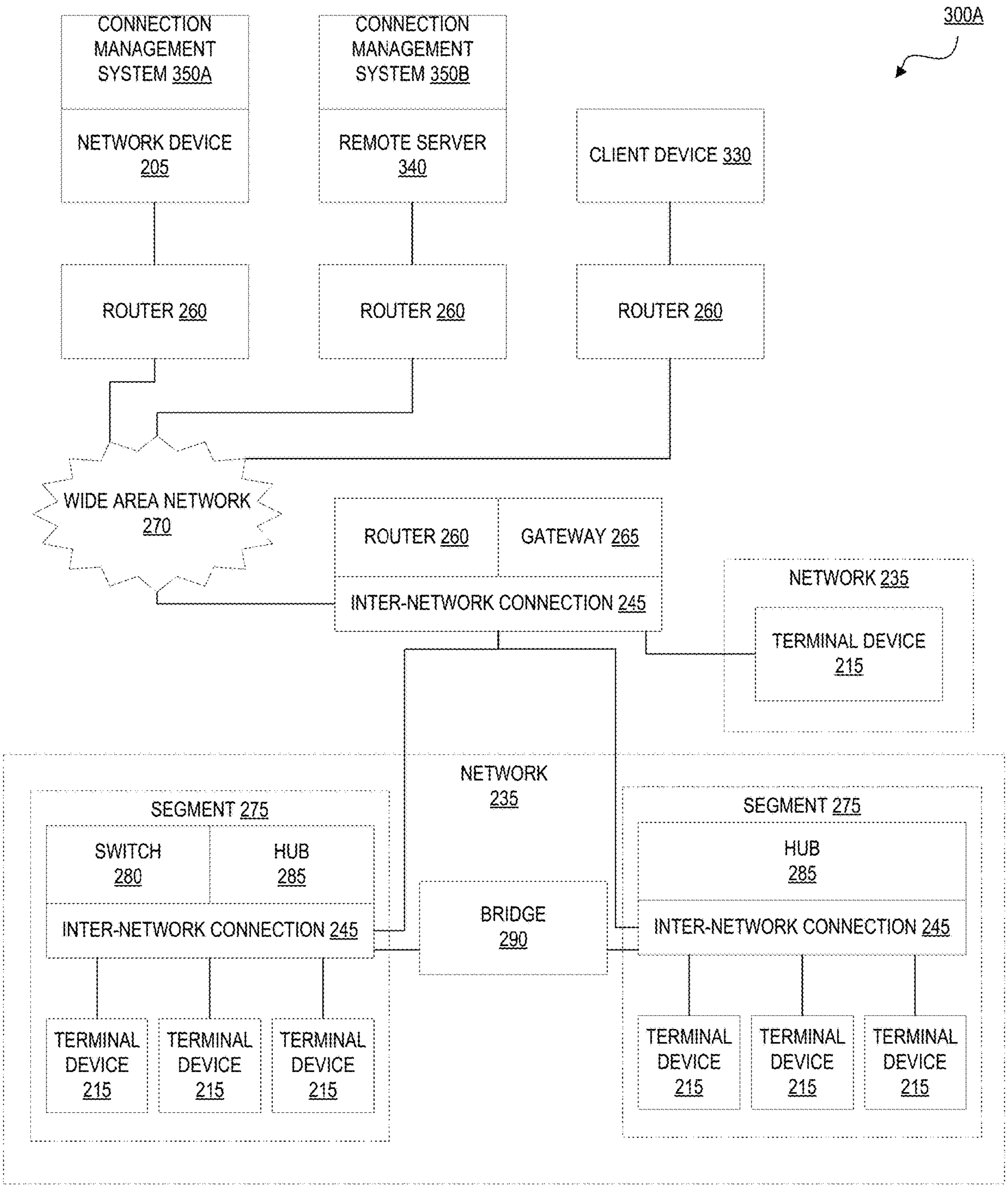
FIGS. 3A, 3B, and 3C show example embodiments of a network interaction system that includes a connection management system for use with a domain specific NLP encoder in accordance with some aspects of the present technology.
Figure 3B:
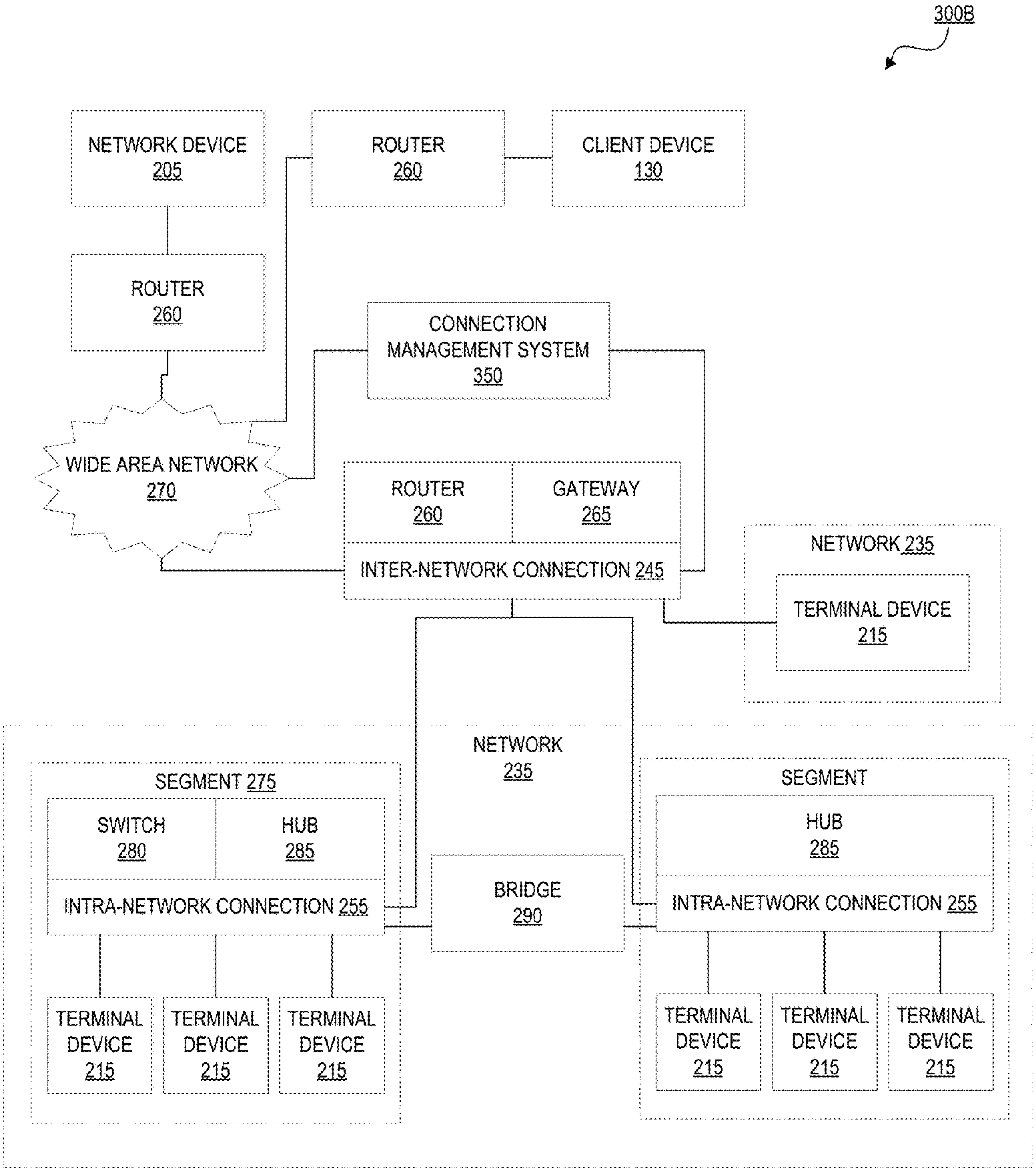
Figure 3C:
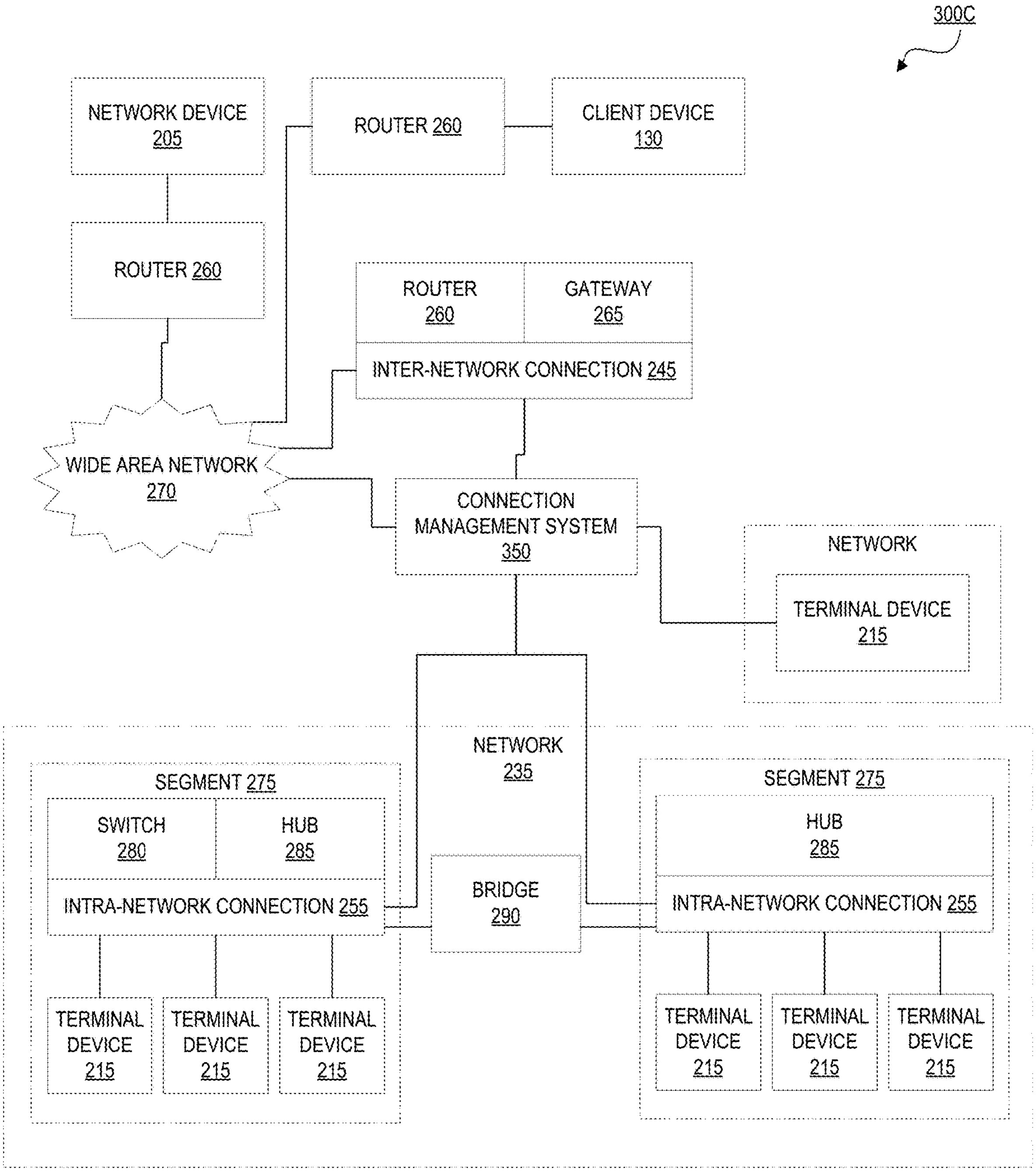

FIGS. 3A, 3B, 3C show block diagrams of other embodiments of a network interaction system 300 (e.g., systems 300A, 300B, 300C that include a connection management system). Each of the depicted systems 300A, 300B, 300C show only two local-area networks 235 for simplicity, though it can be appreciated that embodiments can be extended to expand the number of local-area networks. Each of systems 300A, 300B, 300C include a connection management system 150, which can identify which terminal device is to communicate with network device 205, can establish and manage (e.g., maintain or close) connections, can determine whether and when to re-route communications in an exchange, and so on. Thus, connection management system 150 can be configured to dynamically, and in real-time, evaluate communications, agent availability, capabilities of terminal devices or agents, and so on, to influence routing determinations.

In FIG. 3A, connection management system 350 (e.g, systems 350A and 350B) is associated with each of network device 205 and a remote server 340. In some implementations, connection management system 150 can be installed or stored as a distributed system on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 150*b* executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 150*b* may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 150 can be configured to serve as a relay and/or destination address. Thus, for example, a set of network devices 205 may transmit communications, each identifying connection management system 150 as a destination. Connection management system 150 can receive each communication and can concurrently monitor a set of terminal devices (e.g., so as to generate metrics for each terminal device). Based on the monitoring and a rule, connection management system 150 can identify a terminal device 215 to which it may relay each communication. Depending on the embodiment, terminal device communications may similarly be directed to a consistent destination (e.g., of connection management system 150) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 150 is directly connected to intra-network components (e.g., terminal devices, intra-network connections, or other).

It will be appreciated that many variations of FIGS. 3A-3C are contemplated. For example, connection management system 150 may be associated with a connection component (e.g., inter-network connection component 245 or intra-network connection component 255) such that an application corresponding to connection management system 150 (or part thereof) is installed on the component. The application may, for example, perform independently or by communicating with one or more similar or complementary applications (e.g., executing on one or more other components, network devices or remotes servers).

Figure 4:
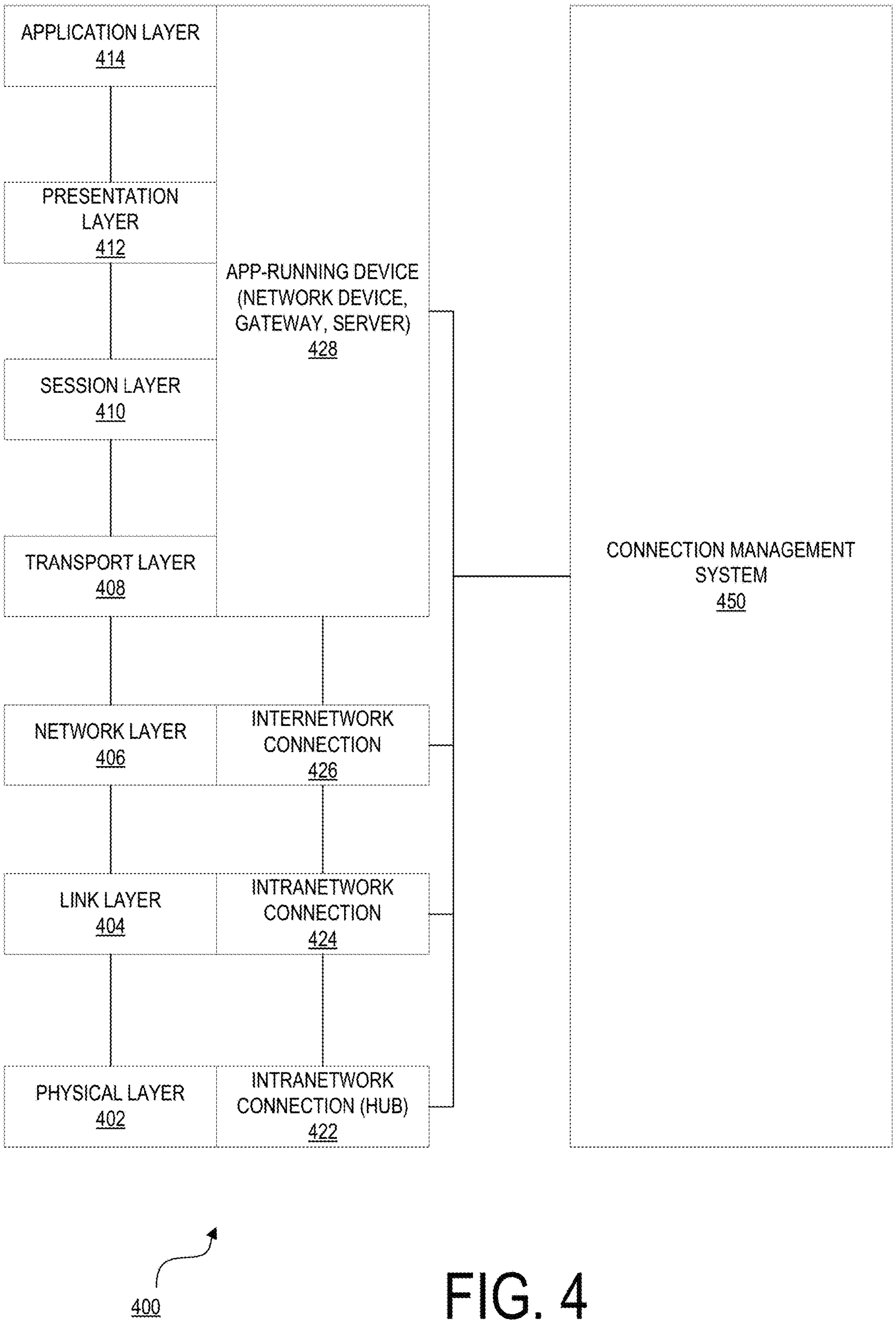
FIG. 4 shows a representation of a protocol-stack mapping of connection components' operation for use with a domain specific NLP encoder in accordance with some aspects of the present technology.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402, 404, 406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402, 404, 406, 408, 410, 412414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406, 408, 410, 412, 414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
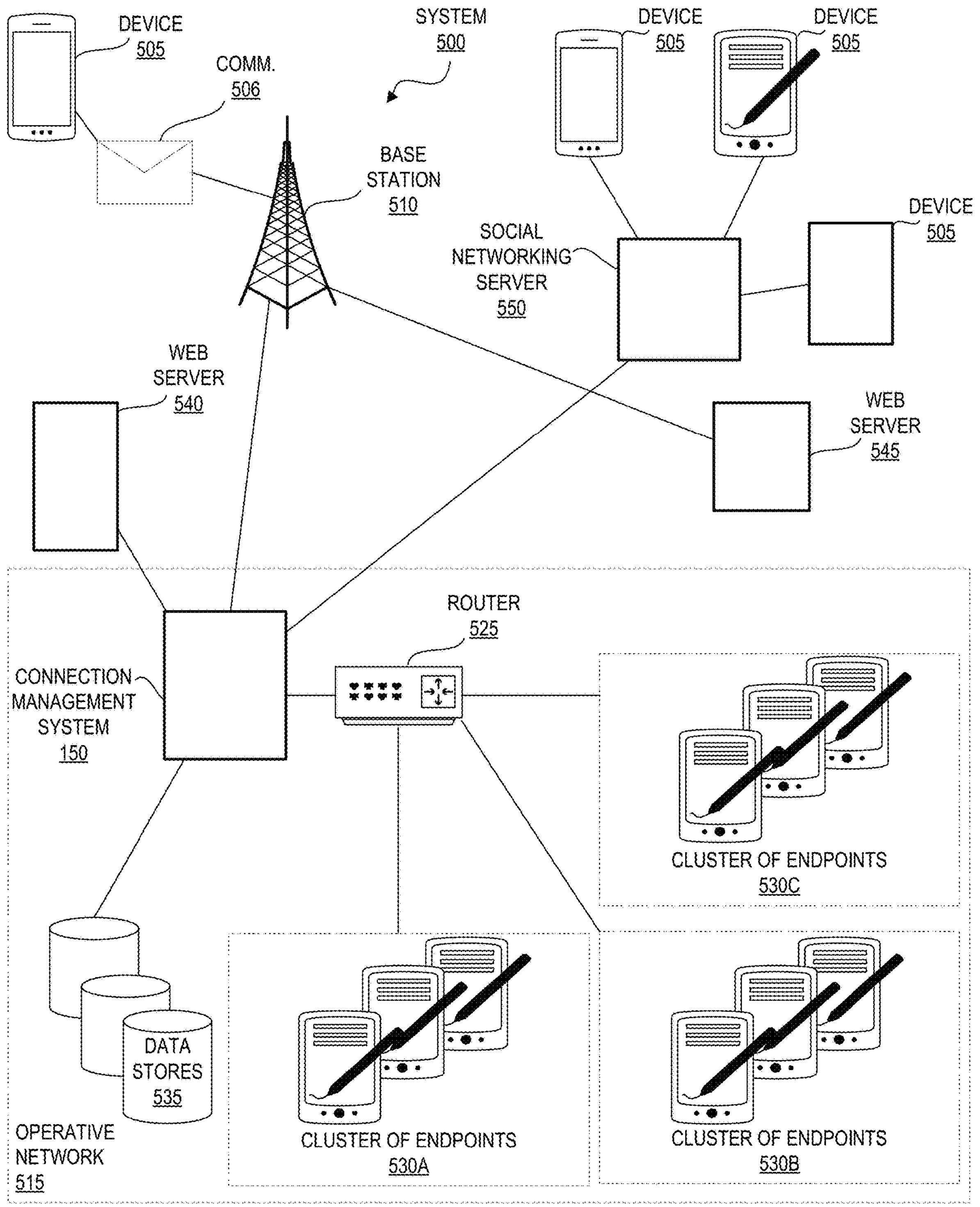
FIG. 5 represents a multi-device communication exchange system embodiment for use with a domain specific NLP encoder in accordance with some aspects of the present technology.

FIG. 5 represents a multi-device communication exchange system 500 according to an embodiment. System 500 includes a network device 505 configured to communicate with a variety of types of endpoints over a variety of types of communication channels.

In the depicted instance, network device 505 can transmit a communication 506 over a cellular network (e.g., via a base station 510). The communication can be routed to an operative network 515. Operative network 515 can include a connection management system 150 that receives the communication and identifies which endpoint is to respond to the communication. Such determination can depend on identifying a client to which that communication pertains (e.g., based on a content analysis or user input indicative of the client) and determining one or more metrics for each of one or more endpoints associated with the client. For example, in FIG. 5, each cluster of endpoints 530A, 530B, and 530C can correspond to a different client. The endpoints may be geographically co-located or disperse. The metrics may be determined based on stored or learned data and/or real-time monitoring (e.g., based on availability).

Connection management system 150 can communicate with various endpoints via one or more routers 525 or other inter-network or intra-network connection components. Connection management system 150 may collect, analyze and/or store data from or pertaining to communications, terminal-device operations, client rules, and/or user-associated actions (e.g., online activity, account data, purchase history, etc.) at one or more data stores 535. Such data may influence communication routing. In some examples, data stores 535 store data that can be used as part of a general dataset to update training for general encoders in system 500, and can also store sorted data as part of context-specific datasets to use in generating distilled encoders as described below.

Notably, various other devices can further be used to influence communication routing and/or processing. For example, in the depicted instance, connection management system 150 also is connected to a web server 540. Thus, connection management system 150 can retrieve data of interest, such as technical product details, news, current product offerings, current or predicted weather, and so on.

Network device 505 may also be connected to a web server (e.g., including a streaming web server 545). In some embodiments, communication with such a server provided an initial option to initiate a communication exchange with connection management system 150. For example, network device 505 may detect that, while visiting a particular webpage, a communication opportunity is available and such an option can be presented.

In some embodiments, one or more elements of communication system 500 can also be connected to a social-networking server 550. Social networking server 550 can aggregate data received from a variety of user devices. Thus, for example, connection management system 150 may be able to estimate a general (or user-specific) intent towards a given topic or estimate a general behavior of a given user or class of users. Social networking server 550 can also maintain a social graph for one or more users. A social graph can consist of first level connections (direct connections) of a social user, and additional levels of connections (indirect connections through the user's direct connections).

Figure 6:
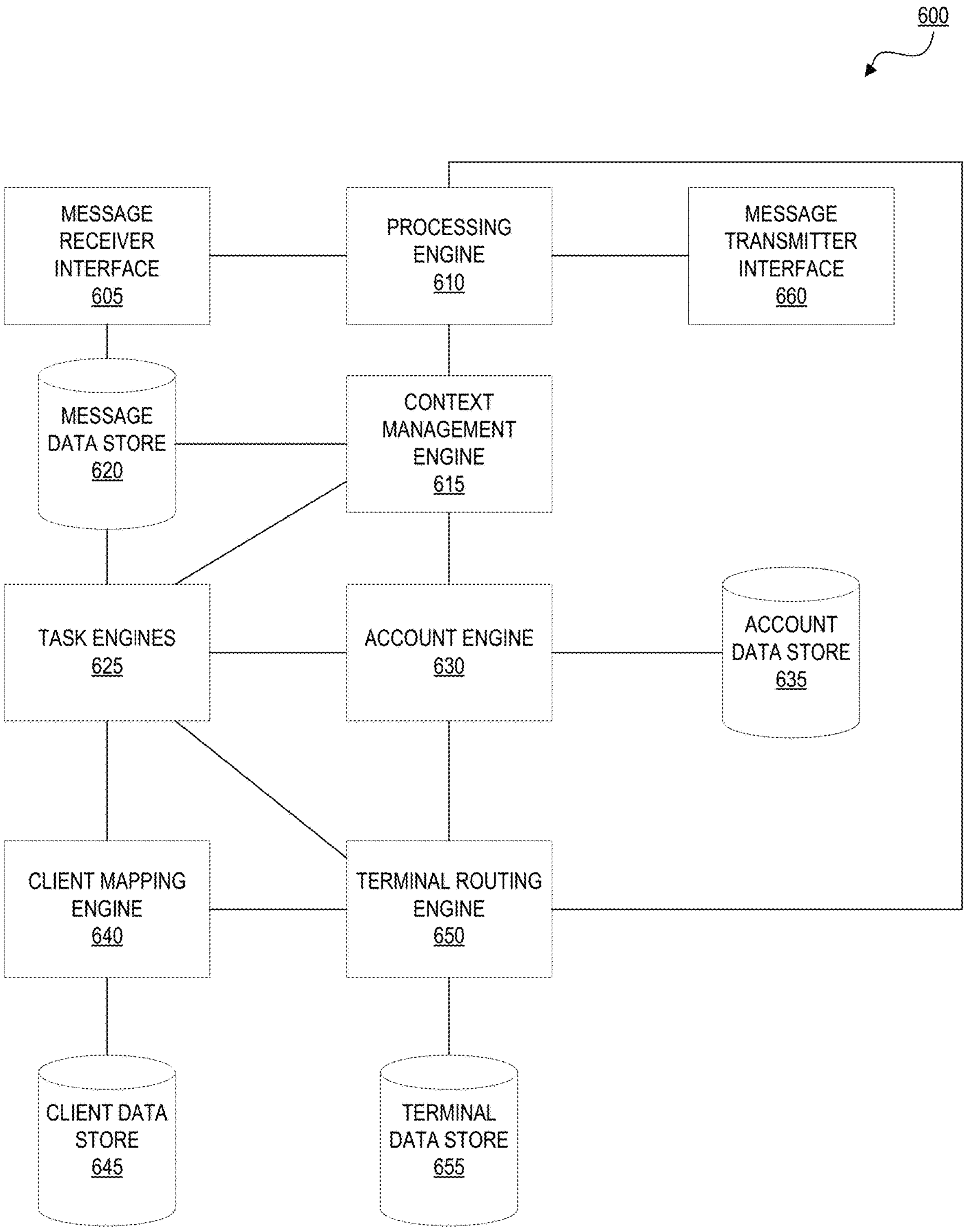
FIG. 6 shows an example embodiment of a connection management system for use with a domain specific NLP encoder in accordance with some aspects of the present technology.

FIG. 6 shows a block diagram of an embodiment of a connection management system 600. A message receiver interface 605 can receive a message and store the message in message data store 620 for later use by other systems (e.g., context management engine 615, task engines 625, etc.). In some embodiments, the message can be received, for example, as part of a communication transmitted by a source device (e.g., housed separately from connection management system 150 or within a same housing), such as a network device or endpoint. In some embodiments, the communication can be part of a series of communications or a communicate exchange, which can include a series of messages or communication exchange being routed between two devices (e.g., a network device and endpoint). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some embodiments, the message can include a message generated based on inputs received at a user interface. For example, the message can include a message that was generated based on button or key presses or recorded speech signals, or speech to text software. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some embodiments, the message can be a natural language communication, whether spoken or typed. A natural language communication, as used herein, refers to ordinary use of a language used to communicate amongst humans, and is contrasted with use of language defined by a protocol required for communicating with a specific virtual assistant or artificial intelligence tool. A natural language communication should not require constraints such as the use of a wake word to alert an artificial intelligence tool that a communication is addressed to the artificial intelligence. Additionally, a natural language communication should not require the user to identify particular key words, specific phrases, or explicitly name a service in order to understand how to service the communication. In some embodiments, natural language may include emoticons and other forms of modern communication.

While the present technology utilizes natural language communications, the communications can identify particular key words, specific phrases, or explicitly name a service. For example, the message can include or be associated with an identifier of a client. For example, the message can explicitly identify the client (or a device associated with the client); the message can include or be associated with a webpage or app associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A context management engine 615 may assess the (e.g., extracted or received) message. The assessment can include identifying, for example, one or more intents or contexts for the message. Examples of contexts can include (for example) topic, sentiment, complexity, and urgency, as well as product specific categories, or other such limits for a domain that can be associated with a distilled encoder. A domain can include, but is not limited to, a subject, a product, a service, a technical issue, a use question, a complaint, a refund request or a purchase request, etc. A domain can be determined directly from a flag or association within the message indicating that the message is intended for an agent associated with a domain, or machine analysis of the message can select a domain based on a semantic analysis of a message (e.g., using NLP by identifying keywords, sentence structures, repeated words, punctuation characters and/or non-article words); user input (e.g., having selected one or more categories); and/or message-associated statistics (e.g., typing speed and/or response latency). Aspects of context management engine 615 can use machine learning to generate and revise systems for associating incoming communications (e.g. text) from a user with a context or domain category. For example, machine learning models can use previous data and results of associations between words and phrases in incoming communications as well as natural language data from current and historical communications to generate and update associations between words and domain categories. Generating and updating associations can be done with any combination of supervised learning with constructed data sets and historical data, unsupervised learning based on expectation or projection models for current routing paths in a system and system use targets. Any such data can be used in operations for NLP (e.g. natural language understanding, natural language inference, etc.) to generate natural language data or to update machine learning models. Such data can then be used by the client systems or shared with applications running on a network device or on a server to improve dynamic message processing (e.g. improved intent indicator data results or response message generation). In some examples, convolutional neural networks can be used with sets of incoming words and phrases along with output intent categories. Such a neural network can be trained with input words and phrases and output correlations to domain categories. Real-time system operations can then use instances of such a neural network to generate data on associations between incoming user communications and words in a user communication and intent categories in a system. Based on the outputs of such a neural network, a domain category can be assigned to a user or user account involved in a communication, and associated actions can be assigned. In some implementations, the neural network settings can be modified with real-time dynamic feedback from usage to shift associations between words in user communications and domain categories and actions selected based on these words. These selections can be probabilistic, and so the AI and machine learning systems can automatically track shifts in user expectations by integrating user feedback and usage data to improve system performance. For example, when a user is directed to an endpoint action for a particular domain category or subcategory, the user can provide a feedback communication indicating that the user is looking for a different action. This can be used as real-time feedback in a system to shift the probabilities and annotations associated with future domain category assignments.

In some embodiments, a domain can be clarified by engaging user 110 in a conversation that can include clarifying questions, or simply requesting additional information. Just as above, various machine learning and AI systems can be used to generate and update systems for responding to a user. For example, in some systems, each domain category and sub-category can have a different associated convolutional neural network. In some examples, an action taken in response to processing words from a user is to associate a domain category and a neural network for the domain category to a communication with a user, and to process the user communications using the assigned neural network. As described herein, multiple different neural networks can be used in the course of a conversation (e.g. multiple back and forth communications between a user and a system), and data for such communications can be used in machine learning operations to update the neural networks or other systems used for future interactions with users and operations to associate domain categories and actions with words from a user communication. Usage data by users can be used to adjust weights in a neural network to improve domain category assignments and track changes in user domain trends (e.g. final user domain results identified at the end of a user conversation with a system as compared with assigned domains based on initial user communications).

Within connection management system 600, a number of different task engines 625 can be implemented to perform classification tasks or other such AI tasks. Any such tasks can use a distilled encoder as part of a particular domain specific task engine that is efficiently configured to perform tasks associated with a limited language domain within the connection management system 600.

For example, an interaction management engine 750 of task engines 625 can determine to which endpoint a communication is to be routed and how the receiving and transmitting devices are to communicate. NLP processing of message information can be configured by a distilled encoder associated with interaction management engine 750 to manage an associated task with language training specialized to a particular domain. Determinations for an interaction management engine 750 can depend, for example, on whether a particular network device (or any network device associated with a particular user) has previously communicated with an endpoint in a set of endpoints (e.g., any endpoint associated with connection management system 150 or any endpoint associated with one or more particular clients). In some examples, an interaction management engine 750 is invoked as an action to route a user communication to a different endpoint based on domain categories assigned to a user communication. This can involve updates to an endpoint (e.g. a particular agent or AI resource) being used during a conversation with a user. In some examples, interaction management engine 750 can be associated with a certain domain. For example, the interaction management engine 750 can be associated with a domain for a certain corporation that produces and supports a variety of different products. Such products, while varying in type and support infrastructure, may nonetheless have a domain with certain linguistic similarities that allow communications coming in to the system to be efficiently managed by a distilled encoder that is focused on the domain of interactions limited by the types of interactions historically seen by the system as part of customer system requests associated with the system products. The history of previous communications associated with the corporation can be used as a domain-specific dataset used to train an encoder as described below to generate an efficient language engine that is configured to particularly handle the domain of client communications associated with the specific corporation's products. In other examples, other datasets can be used to train the domain besides history data in order to create a language engine. The interaction management engine 750 can process incoming communications using a domain specific language engine (e.g., including domain specific distilled encoder data for distilled encoder processing of incoming data associated with the domain) in order to route communications to different sub-systems or identify other sub-systems or AI engines more specifically adapted to a particular communication. As described herein, the interaction management engine 750 can include one distilled encoder adapted to the domain of routing incoming communications to different specialized subjects within a domain (e.g., different product domains within an overall company context), and then each routing endpoint can use a distilled encoder, which can either be the same or different distilled encoders depending on the size of the routing domain and how different the endpoint domains are.

With regard to determining how devices are to communicate, interaction management engine 750 can (for example) determine whether an endpoint is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more endpoints. Appreciably, some communication types will result in real-time communication (e.g., where fast message response is expected), while others can result in asynchronous communication (e.g., where delays (e.g., of several minutes or hours) between messages are acceptable). Just as above, such analysis can be influenced by a distilled encoder that has been trained on language for a particular context, in addition to any other AI or machine based decision making.

In some embodiments, the communication type can be a text messaging or chat application. These communication technologies provide the benefit that no new software needs to be downloaded and executed on users' network devices. In some examples, the communication type can be a voice communication type. In such examples, voice to text systems can be used to process voice communications into words to be analyzed by example systems described herein. In some examples, words analyzed by a system can include words represented by audio data. Thus, as described herein, words can be represented by combinations of symbols stored in memory (e.g. American Standard Code for Information Interchange (ASCII) data) or can be represented by audio data (e.g. data representing sound combinations). Any such data can be processed by a distilled encoder as described herein.

Further, interaction management engine 750 can determine whether a continuous channel between two devices (e.g. for a conversation or repeated transmissions between a user device and a system) should be established, used or terminated. A continuous channel can be structured so as to facilitate routing of future communications from a network device to a specified endpoint. This bias can persist even across message series (e.g., days, weeks or months). In some embodiments, a representation of a continuous channel (e.g., identifying an agent) can be included in a presentation to be presented on a network device. In this manner, a user can understand that communications are to be consistently routed so as to promote efficiency.

Interaction management engine 750 or any task engine 625 can interact with an account engine 630 in various contexts. For example, account engine 630 may look up an identifier of a network device or endpoint in an account data store 635 to identify an account corresponding to the device. Further, account engine 630 can maintain data about previous communication exchanges (e.g., times, involved other device(s), channel type, resolution stage, topic(s) and/or associated client identifier), communication channels (e.g., indicating—for each of one or more clients—whether any channels exist, an endpoint associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on). Such information can be used to identify a domain and select between different distilled encoders based on contexts or domains identified by an account engine 630.

Further, a task engine 625 can alert account engine 630 of various connection-channel actions, such that account data store 635 can be updated to reflect the current channel data. For example, upon establishing a channel, interaction management engine 750 can notify account engine 630 of the establishment and identify one or more of: a network device, an endpoint, an account and a client. Account engine 630 can subsequently notify a user of the channel's existence such that the user can be aware of the agent consistency being availed.

A task engine 625 can further interact with a client mapping engine 640, which can map a communication to one or more clients (and/or associated brands). In some embodiments, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client, and such information can be used to identify a domain or context as described above, to assist in selecting between different engines of task engines 625 having specific distilled encoders for a particular domain or context.

In some embodiments, a message may not particularly correspond to any client. For example, a message may include a general query. Client mapping engine 640 may, for example, perform a semantic analysis on the message, identify one or more keywords and identify one or more clients associated with the keyword(s). In some embodiments, a single client is identified. In some embodiments, multiple clients are identified. An identification of each client may then be presented via a network device such that a user can select a client to communicate with (e.g., via an associated endpoint). In some such examples, an initial analysis with a general encoder can be used to identify a domain for a message, allowing distilled encoders of task engines 625 to perform further processing, or allowing routing of the message to an endpoint (e.g., a different server or device) associated with a domain and having distilled encoders for that domain in accordance with the descriptions herein.

Client data store 645 can include identifications of one or more endpoints (and/or agents) associated with the client. In different examples, information for the client can be associated with a domain, or sub-areas for a client can be associated with different domains, and different groups of agents and endpoints can be associated with different sets of domains. A terminal routing engine 650 can retrieve or collect data pertaining to each of one, more or all such endpoints (and/or agents) so as to influence routing determinations. For example, terminal routing engine 650 may maintain an endpoint data store 655, which can store information such as endpoints' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether an endpoint is available may be dynamically updated based on (for example) a communication from an endpoint (e.g., identifying whether the device is asleep, being turned off/on, idle/active, or identifying whether input has been received within a time period); a communication routing (e.g., indicative of whether an endpoint is involved in or being assigned to be part of a communication exchange); or a communication from a network device or endpoint indicating that a communication exchange has ended or begun. In different examples, any grouping of the above can function as a domain, with limiting information used in a distilled encoder.

It will be appreciated that, in various situations, being engaged in one or more communication exchanges does not necessarily indicate that an endpoint is not available to engage in another communication exchange. Various factors, such as communication types (e.g., text, message, email, chat, phone), client-identified or user-identified target response times, and/or system loads (e.g., generally or with respect to a user) may influence how many exchanges an endpoint may be involved in.

When a connection management system 600 is done processing a message and determines to relay a message to an endpoint, a message transmitter interface 660 can then transmit the communication to the endpoint. The transmission may include, for example, a wired or wireless transmission to a device housed in a separate housing. The endpoint can include an endpoint in a same or different network (e.g., local-area network) as connection management system 150. Accordingly, transmitting the communication to the endpoint can include transmitting the communication to an inter- or intra-network connection component.

Figure 7:
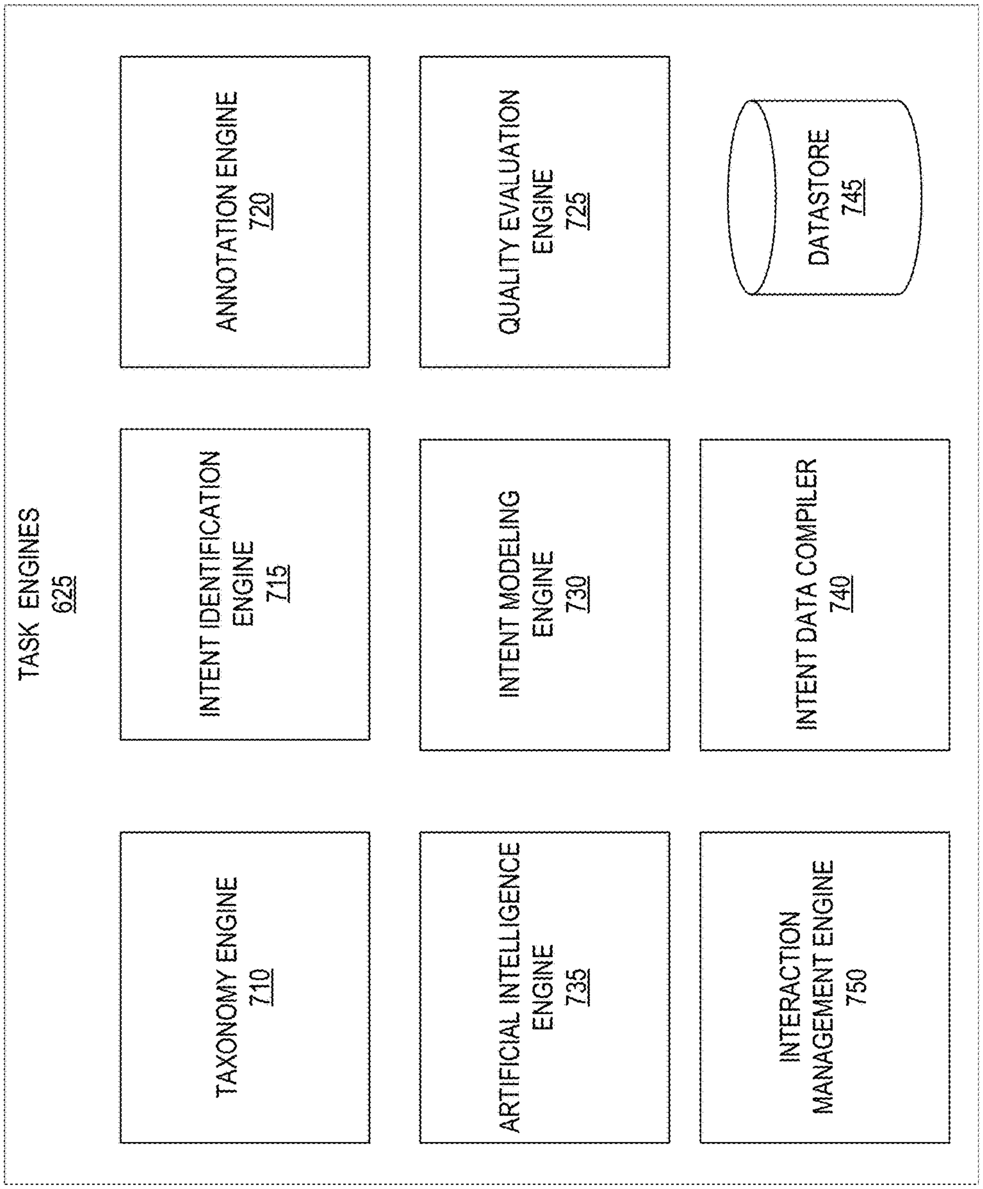
FIG. 7 shows an example embodiment of a system of task engines that can include one or more engines with domain specific NLP encoders in accordance with some aspects of the present technology.

FIG. 7 shows an example embodiment of a different task engines 625 in accordance with some aspects of the present technology. In different examples, different tasks engines 625 can be present in a connection management system 600 as described above, but in other examples tasks engines in accordance with the descriptions herein can be present in any device, including client devices, agent devices, customer devices, or any other device that is configured for domain specific AI processing and task performance. Some examples of task engines 625 may include a taxonomy engine 710, an intent identification engine 715, an annotation engine 720, a quality evaluation engine 725, an intent modeling engine 730, an artificial intelligence engine 735, an intent data compiler 740, and the interaction management engine 750. Different devices may include any combination of such engines, or other engines including a distilled encoder for domain specific NLP. Combinations of such engines can generate different combinations of data, and the resulting compiled data may be provided to an interface of a computing device, such as a network device, a client device, and/or a terminal device for analysis and/or manipulation, as described further herein.

Communication 705 may be provided to a taxonomy engine 710. Communication 705 may be in natural language as described herein and may include one or more words. In some embodiments, communication 705 can include words in different languages, words embodied as pictograms or emoticons, or strings of characters or images associated with intent categories regardless of standard meanings or dictionary meanings. In some examples, words can be received in communication 705 as audio data. Taxonomy engine may be configured to, in conjunction with a processor, parse the communication 705 to identify one or more key words, also referred to herein as "operative words". The operative words may be related to an action available to a user initiating the communication 705. For example, communication 705 may state, "I want to pay my bill." The operative words may be "pay bill". The taxonomy engine 710 may pass the operative words to the intent identification engine. The intent identification engine 715 may, in conjunction with a processor, receive the operative words from the taxonomy engine 710. The intent identification engine 715 may use the operative words to identify an intent. Example intents include "pay_bill", "change_address", "speak_to_representative", "change_due_date", "product_information", "make_a_reservation", "make_a_purchase", and the like. The intent may define the action available to the user originating the communication 705. In some embodiments, the intents may be predefined and stored in an datastore 745. In such embodiments, the intent identification engine 715 may query the datastore 745 with the operative words to locate a corresponding predefined intent. For example, the intent identification engine 715 may query the datastore 745 with the words "pay bill" to identify a closest matching intent of "pay_current_bill". In some embodiments, the operative words may not correspond to an existing intent. In such embodiments, the intent identification engine 715 can create a new intent and save it to the datastore 745 in correlation with the operative words received. The intent identification engine 715 may pass the identified intent to the annotation engine 720.

In another example, the intent identification engine can be implemented with AI processors, neural networks, or other systems for analyzing the communication or portions of communication 705. This can include natural language processing to select an intent value associated with a message from a client device. For example, if client device were to text "appointments" word could be processed to identify an intent category for scheduling using intent identification engine 715. Such intent categories can further include actions or subcategories such as action options to see all appointments, cancel appointments, reschedule appointments, or other such values. Using the intent identification engine, the text "appointments" can be processed to select a response associated with an intent value. In one example, a machine learning model of intent identification engine 715 can determine that receiving a response message associated with an intent value of seeing all appointments corresponds most closely with the intent indicator data "appointments", and respond with a message to clarify the intent category. For example, the responsive action can be a message with the content "see all appointsments?" By contrast, a new message from a client device with "new appointment", "cx apptmt", "apt?", "nxt apt", "apt time?", or "cng apt time?" could each result in intent identification engine 715 providing a different response based on a different intent value determined from the words identified from the message.

An intent identification system can use words from a message as operative words or inputs to an AI analysis to identify an intent category. The words operate as intent data that can be and aggregated with history data, user profile data, or any such source for a user to customize an intent analysis and select an intent category for a communication from a user device. One example can include natural language text from a customer indicating an attempt to move money between a main account and a new flex account that has opened and that is associated with the customer. The intent processing system can evaluate the words in the user communication to determine the issue that the customer wishes to have addressed. In this particular instance, the customer may be having trouble transferring funds from one online account to another account. Based on the provided words, the intent identification engine 715 may gather data from multiple sources to determine which intent categories, subcategories, and associated actions to use in response to a user communication. In some examples, context data can be used in addition to the words of the user message. This context data can include intent or action values associated with a context that the request or issue is shared in, a level of urgency, a stress or anxiety level of the customer, whether there is a time pressure, and the like.

In one example, based on an identified intent category, an intent identification engine 715 selects an artificial intelligence engine 735 based on an identified intent category. This particular artificial intelligence engine 735 can be selected from multiple different AI engine options. For example, different intent categories or groups of categories can be associated with different AI engines, including AI engine 735. AI engine 735 is associated with an intent category in order to resolve the issue or request provided by the customer that is associated with the identified intent category. For example, based on the intent category identified from a user communication, a system can determine that accounts have to be authorized before customers can transfer funds into them. Further, the system can determine that authorizing an account can be performed online. Based on the identified process, the intent identification engine 715 selects an AI engine 735 that facilitates actions for responding to the customer intent in a manner that would not only resolve the intent but do so in a manner that leads to a positive customer experience. This can include directing the customer to a client customer service node, or assisting with establishing a connection channel with such a node. In addition to AI engine 735 selected routing paths, a system can generate customized natural language communications associated with the customized routing paths based on the data (e.g. intent indicator data, action data, user demographic data, etc.) This can include customized language and terminology for a user (e.g. "I see the issue") to provide information customized to the user as an action in response to the user communication and the intent category identified by intent identification engine 715. Such systems improve the operation of the devices and communication systems by reducing the system resources used by individual users to reach an appropriate resolution, and to improve communication efficiency.

In some examples, a machine learning model of intent modeling engine 730 can use a feedback system that monitors communications between a network device (e.g. customer) and a service (e.g. client). Such a performance monitoring system can monitor the interactions between the customer and client to determine whether the client is being effective in addressing the intent of a customer. Such monitoring can also provide training data for updates to intent identification engine 715, AI engine 735, intent modeling engine 730, quality evaluation engine 725, or any other aspect of context management engine 615. For instance, the performance monitoring system may evaluate any customer utterances to determine whether the intent is being fulfilled as new intent indicator data is received from a customer (e.g. monitoring frustration levels or machine learning identified indicators that a customer is not achieving expected results from interactions with current nodes of a client system). As an illustrative example, the performance monitoring system may determine that when the customer responds with "Done," the customer has acknowledged positive results from a client provided routing path, and that the customer was able to select a routing path to achieve the customer's intent. Further, when the customer responds with "Thanks! That worked!" the performance monitoring system may determine that the customer's intent has been met. This information can then be used to update machine learning models for any aspect of the system, including analysis of other user's intent indicator data to identify intent values for future system users. For instance, the performance monitoring system may implement an investigative algorithm that monitors client metrics to determine why certain routing paths are selected with negative or positive customer results. Based on this determination, the performance monitoring system can provide feedback to a machine learning algorithm to update operations, node selections, and routing paths to improve system performance. In different implementations, such updates can be aggregated and presented to a client for approval and publication to user facing communication channels, or can be configured for automatic continuous real-time or near real time (e.g. as queued in a system given processing and other resource limitations) dynamic updates. In some examples, the dynamic updates are automatically implemented with threshold tracking to check shifts in annotation data and require customer review when certain thresholds are exceeded by automatic dynamic updates. For example, if a certain word is assigned an initial correlation value with an intent category, a threshold change of more than a given percentage (e.g. 5%, 20%, 50%, etc.) away from the original annotation value can require review and approval by a system administrator or client. This can prevent unexpected trends in data from unexpectedly breaking system operations or generating actions that do not align with user and client expectations. As described herein, a server system supporting ca connection management system (e.g., connection management system 150) can perform any such operations, or the operations can be part of a networked server system with different sub-systems or engines operating together to perform such operations.

The annotation engine 720 may, in conjunction with a processor, receive the identified intent category from the intent identification engine 715. The annotation engine 720 may facilitate annotation of the identified intent. Annotation may define a quality of the association between the communication and the identified intent. In some embodiments, the annotation engine 720 may automatically evaluate the quality of the association by applying a formula. For example, the annotation engine 720 may automatically calculate a quality of 66% between the operative words "pay bill" and the intent "pay_current_bill", while a quality of 100% may be assigned to the operative words "pay bill" and the intent "pay_bill". In some embodiments, the annotation engine 720 may provide the operative words and the identified intent to a user interface of a computing device in order to receive a manual evaluation of the quality of the association. This manual evaluation can be provided as feedback by an agent monitoring an AI based response to a user communication. This manual evaluation can also be used after the communication to generate training data to be used in revisions to any aspect of context management engine 615.

In some examples, annotation engine 720 can operate in parallel with AI engine 735. In such systems, when intent identification engine 715 selects an intent category, the AI engine and annotation engine 720 are separately provided the intent category. AI engine 735 can automatically select one or more actions based on the intent category. The annotation engine 720 can provide confidence feedback on any aspect of the operation of context management engine 615. This can include confidence in the selection of a particular intent category when compared with other possible intent categories. This can include confidence among multiple possible actions identified by AI engine 735. Annotation engine 720 can provide a quality check on AI selection operations that can be used both for setting threshold actions for a response to a current communication 705, as well as generating training data for updating any aspect of context management engine 615. For example, annotation engine 720 can identify a qualitative confidence score associated with an intent or an action responsive to a communication. In some examples, if the annotation engine 720 qualitative score is below a threshold value, a fallback action is taken, such as routing the communication to a particular agent or other endpoint rather than relying on an AI response. In other examples, agents can be grouped by performance. Annotation engine 720 results with high confidence scores can be routed to lower performing agents, as the threshold for error and the expected outcome is less likely to be impacted by the agent performance. Annotation engine 720 results with low confidence scores, where agent discretion is more likely to be important, can be routed to agents with higher performance scores. This can also be used to create confidence in training data, with higher performing agents reviewing complex aspects of context management engine 615 performance and providing feedback on intent categories that can result in new categories or other significant system changes. Annotation engine 720 can thus, for example, not only provide qualitative values as part of intent category feedback, but can also be used to identify missing categories that can be added to a system, unnecessary or redundant categories (e.g. intent categories which regularly have similar confidence values and result in similar or identical system actions), or other such issues.

The intent modeling engine 730 is configured to, in conjunction with a processor, build a model of intents based on the taxonomy and annotations made for the intents. The model may be used to help refine the intents, add new intents, associate different taxonomy with an intent, associate different intents with certain taxonomy, and the like.

The artificial intelligence engine 735 is configured to, in conjunction with a processor, apply artificial intelligence to the intent model to aggregate intent-related data and draw conclusions about actions that may be taken based on the results and analysis. The intent data compiler 740 is configured to, in conjunction with a processor, aggregate the information output by the artificial intelligence engine 735 and formulate it in such a way that can be displayed by the computing device. The computing device is able to manipulate and configure the data displayed and analyzed. The artificial intelligence engine 735 may be implemented by, for example, a computer configured with artificial intelligence systems to learn, apply, and iteratively develop better models for reflecting intents. These models may be refined over time with incoming data to learn trends in the data and to better predict intents. As described above, artificial intelligence engine 735 may be part of a system with multiple AI engines, or can include different AI systems. For example, in certain systems, each intent category can be associated with a different neural network. The specific combinations of operative words or words received in a communication can be analyzed by a specific neural network customized for a particular intent category. By using different neural networks for narrower intent categories, the size and complexity of the individual neural networks is limited and can be managed and more efficiently in the context of system resource limitations. For example, a neural network deciding whether a user is attempting to pay a current bill, a past bill, or a partial bill payment will be less complex and resource intensive that a neural network that decides between these options as well as options for account access help, fraud assistance, new account opening, or other widely divergent actions that can occur in a system. Using a distilled language encoder as part of an engine to perform such tasks in a domain limited information environment, however, limits the resource usage compared with using a general NLP engine for such a task.

In any of the language analysis examples above, a distilled encoder will not just perform the language analysis, but can provide improved results due to the domain specific training of the distilled encoder data. Many domains are filled with idioms, common misspellings, or other context specific language that general NLP will miss. For example, a programming technical domain can include words with a specialized meaning within the domain and a different more common meaning outside of the domain. "Python", "float", and "terminal" have very different meanings in a programming domain than in a most common general language interpretation. General encoder data is expected to interpret "java" as more similar to coffee, but a programming specific distilled encoder can interpret "java" as referring to the Java™ programming language. Particularly due to BERT structures having embeddings that are contextual where a single word is represented by multiple token embeddings, the distilled encoder data for a context can provide superior NLP task performance due to capture of the presence of preferred language of a context that is not the primary use in general language datasets.

Further, due to the structure of the training (e.g., as illustrated in FIG. 1C), the domain specific datasets used to train a distilled encoder does not need to be labeled. This allows both domain specific data to be used from a domain information environment to be used in training distilled encoder data without significant processing before use, as well as the ability to gather domain specific data from a system that is using a distilled encoder, and to use that data as part of an updated domain specific dataset to refine and improve a distilled encoder until a threshold performance level is reached.

For example, a domain can be identified along with a task that would benefit from an engine using a distilled encoder, but where a domain specific dataset is either unavailable or insufficiently large to produce preferred results. In such an example, an initial NLP encoder can be implemented, either with a general system or a distilled encoder with insufficient domain specific training. During operation, the real-time data received by the domain specific task engine can be gathered and added to the domain specific dataset. The updated domain specific dataset can either be used repeatedly with performance measured against NLP criteria until a threshold performance is met, or a threshold amount of domain specific data can be gathered to match an amount of domain specific data expected to achieve target results. The domain specific data gathered during use can then be used to train an updated distilled encoder which can be used in an updated language engine for domain specific NLP tasks. In some examples, 3 gigabits of domain specific language datasets achieved target performance levels, while domain specific datasets smaller than 2 gigabits resulted in significantly degraded NLP performance.

Figure 8:
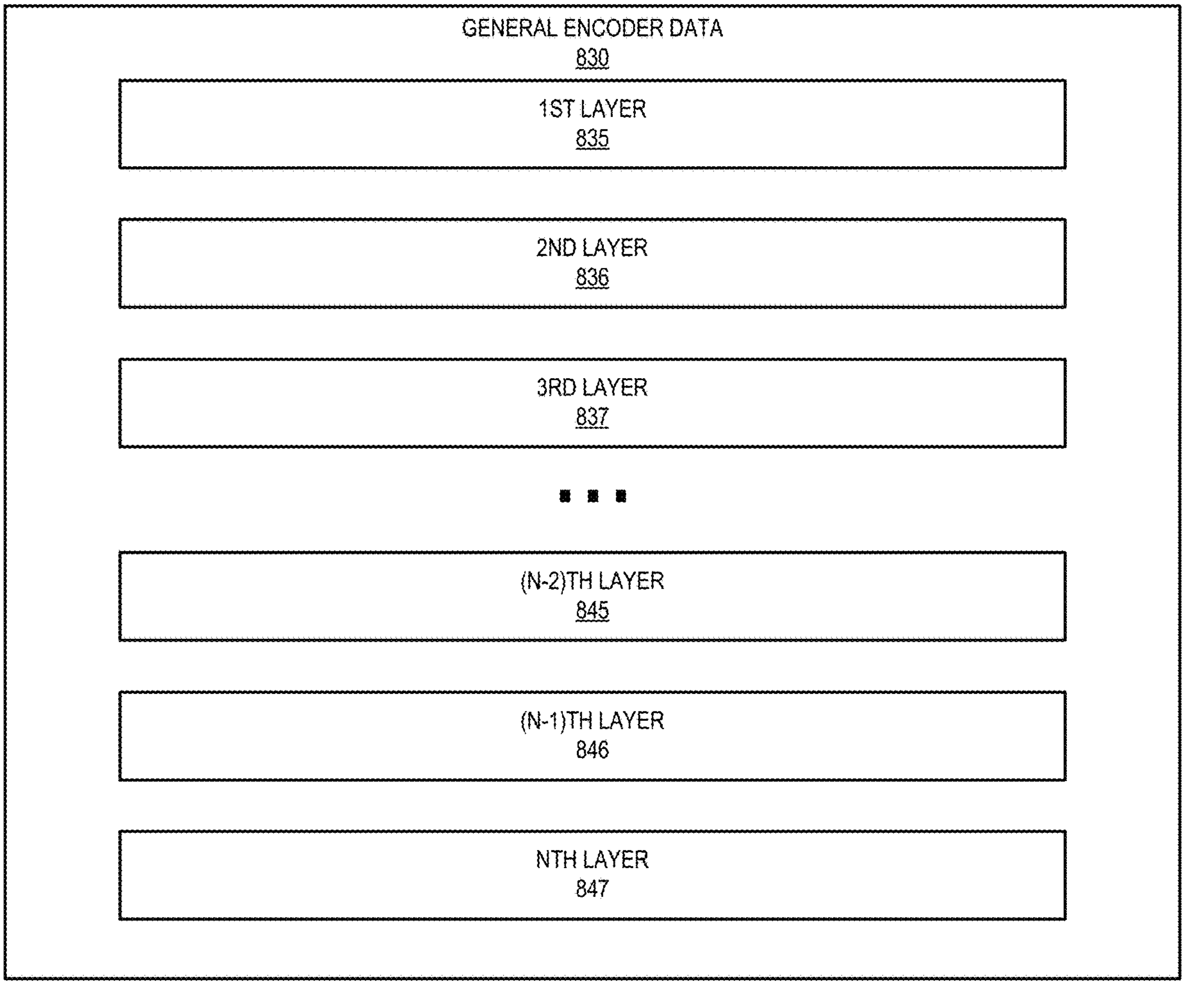
FIG. 8 illustrates aspects of distilled encoder processing in accordance with some aspects.
Figure 9:
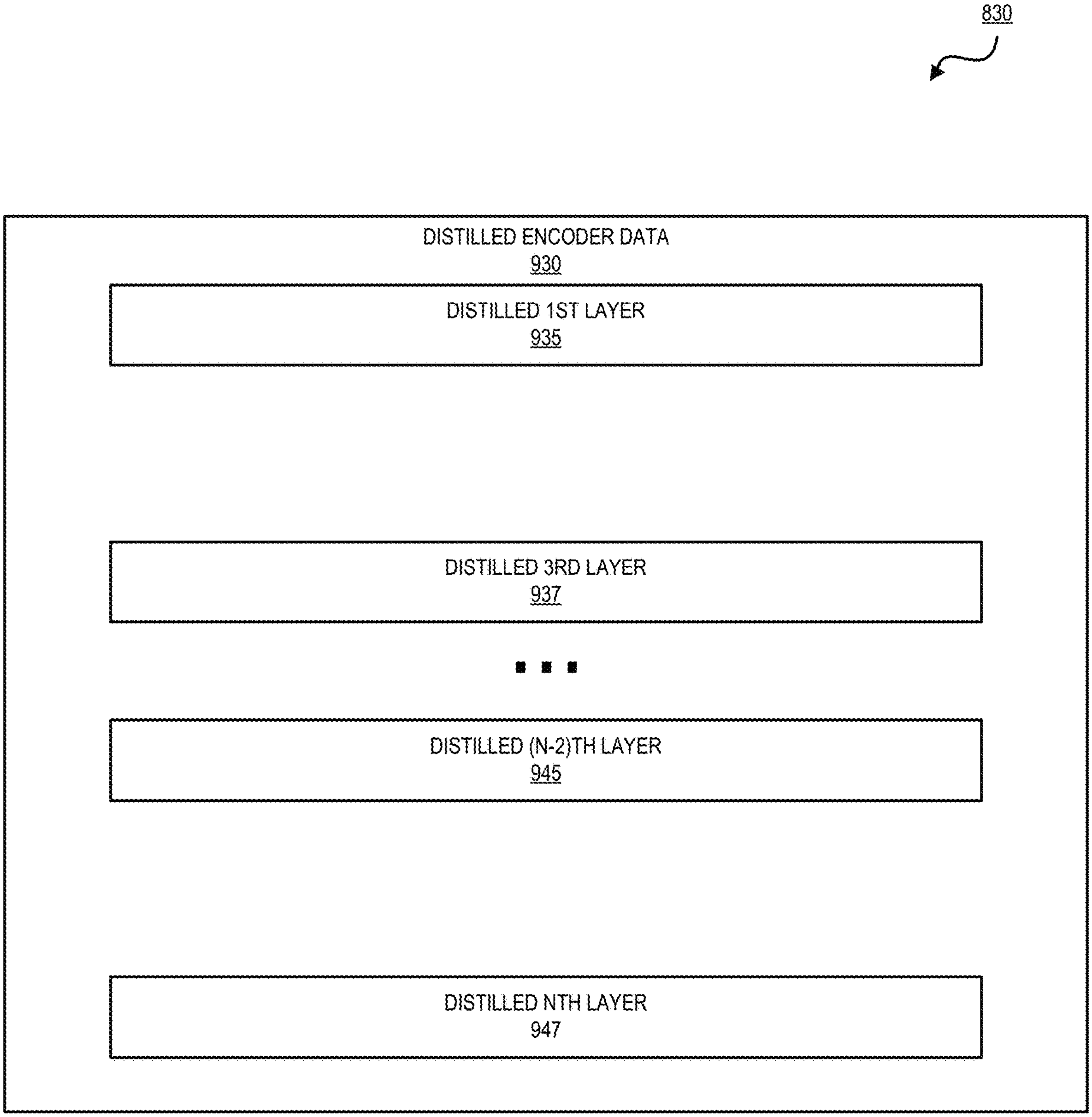
FIG. 9 shows a flowchart of a method embodiment in accordance with some aspects of the present technology.

As described above, in order to generate functional distilled encoder data, general encoder data can be used and then filtered before being trained with a domain specific dataset. FIG. 8 illustrates a general structure of an example of general encoder data 830. As described above with respect to FIG. 1C, general encoder data 830 can be generated by starting with a model (e.g., BERT), and training the model using a large general dataset. The structure of the model and the resulting dataset can be modified for specific implementations, but can include layers with different connections and network values (e.g., neural network connections) between the layers. FIG. 8 is thus generally describing a high level encoder structure, and the details of a specific implementation will be apparent to one of skill in the art. The example structure of general encoder data 830 includes N layers, from $1^{st}$ layer 835, $2^{nd}$ layer 836, and $3^{rd}$ layer 837 through a final 3 layers 845, 846, and 847. The filtering process described above with respect to FIG. 1C block 194 can involve removing a subset of the layers of general encoder data 830 to generated filtered encoder data. Training the filtered data while maintaining the layer structure resulting from the removal of layers in general encoder data 830 results in the distilled encoder data of FIG. 9.

For example, if general encoder data 830 is structured with 25 layers, and the even layers are removed, this results in filtered encoder data with 13 layers, where the $2^{nd}$ layer 836 and the n−1th layer 846, along with other central layers, are removed. The resulting filtered encoder data (not shown) is missing the exact neural network connections between the layers that provided performance for NLP, but will have nearly half the size of the general encoder data 830. Training the filtered encoder data with a domain specific dataset while maintaining the 13-layer structure of the filtered encoder data can provide domain specific NLP functionality with a significantly reduced memory footprint. The example resulting distilled encoder data 930 with layers named to match the layers of FIG. 8 include distilled 1st layer 935, a distilled 3rd layer 937, distilled (N−2)th layer 945, and distilled Nth layer 947, with the even layers missing due to the filtering. With appropriate training and fine tuning in an engine implementation, the distilled encoder data 930 can provide improved domain specific performance when compared with the general encoder data 930, with reduced resource usage. As described above, in some examples, when distilled encoder data 930 is used in a language engine (e.g., language engine 184, or a language engine of any task engine 625) the real-time data processed by the engine can be gathered and used to update the domain specific dataset. The distilled encoder can then be retrained with the updated domain specific dataset, and performance can be tested using different domain specific datasets (e.g., using both different data as well as different sizes of training data) to find a preferred performance balancing an increased distilled encoder size associated with a larger domain specific training dataset compared with performance for the different datasets. Such performance can be measured for the distilled encoders trained with different domain specific datasets using standardized NLP performance measuring tool along with an analysis of domain specific language vectors associated with NLP of domain specific definitions and language.

Figure 10:
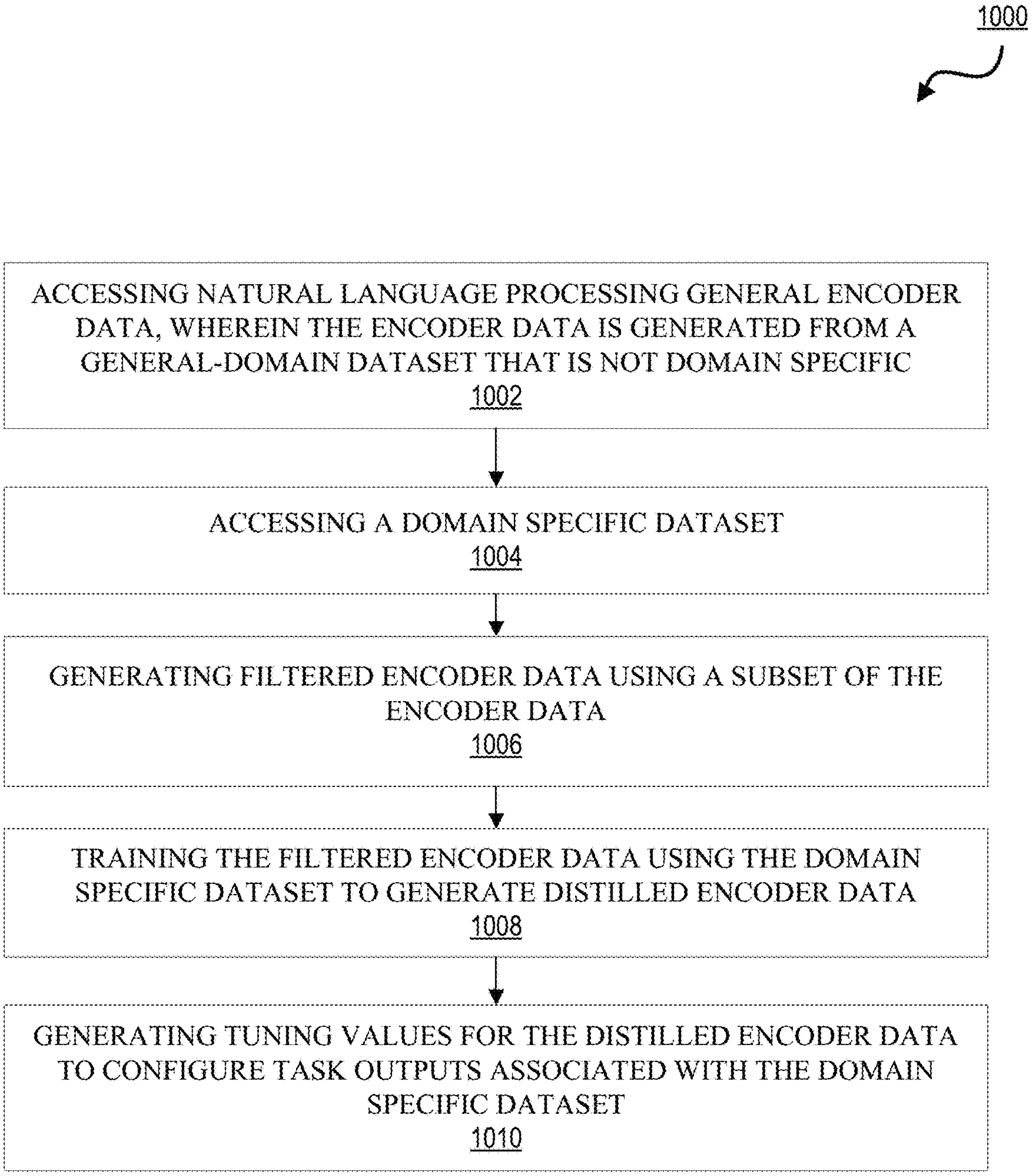
FIG. 10 shows a flowchart of a method embodiment in accordance with some aspects of the present technology.

FIG. 10 an example shows a flowchart of a method 1000 in accordance with some aspects of the present technology. In some examples, method 1000 can be performed by a device, such as the device of FIG. 11 or any device described herein. In some examples, method 1000 can be instructions stored in a computer readable medium that, when executed by one or more processors of a device, cause the device to perform method 1000.

Operation 1002 of method 1000 includes accessing natural language processing general encoder data, wherein the encoder data is generated from a general-domain dataset that is not domain specific.

Operation 1004 of method 1000 includes accessing a domain specific dataset. The domain specific dataset can be any limited dataset described herein, such as data from one or more textbooks, history data from a business or context specific dataset (e.g., for a product or set of products), or any other such dataset that is limited or directed to a domain to be used for the trained NLP system.

Operation 1006 of method 1000 includes generating filtered encoder data using a subset of the encoder data.

Operation 1008 of method 1000 includes training the filtered encoder data using the domain specific dataset to generate distilled encoder data.

Operation 1010 of method 1000 includes generating tuning values for the distilled encoder data to configure task outputs associated with the domain specific dataset.

In some examples, method 1000 can include additional operations, repeated operations, or intervening operations. For example, after generation or update of tuning values and/or update of distilled encoder data, examples can use such tuning data and distilled encoder data to analyze incoming datasets or communications in real-time for domain specific real-time NLP as described above.

In some examples, method 1000 can be followed by operations including processing a real-time stream of domain specific data using the distilled encoder data; updating the domain specific dataset using the real-time stream of domain specific data; retraining the filtered encoder data using the updated domain specific dataset to generate updated distilled encoder data; generating performance metrics for the distilled encoder data and the updated distilled encoder data; and selecting between the distilled encoder data and the updated distilled encoder data based on the performance metrics.

Some examples can operate where the domain specific dataset is unlabeled data. Some examples can operate where the distilled encoder data is configured to identify categories associated with labels of the domain specific dataset. Some examples can operate where the domain specific dataset includes unlabeled data. Some examples can operate where the distilled encoder data is configured to identify real-time data in a two-way communication associated with an actionable request. Some examples can operate where training the filtered encoder data using the domain specific dataset includes performing dynamic masking with randomly selected words in the domain specific dataset in sufficient quantity to leverage gradient accumulation. Some examples can operate where training the filtered encoder data using the domain specific dataset includes training the filtered encoder data using a masked language model. Some examples can operate where the domain specific dataset is smaller than a threshold size, and wherein the threshold size is smaller than the general-domain dataset. Some examples can operate where the general-domain dataset is distinct from the domain specific dataset. Some examples can additionally include accessing the general-domain dataset used to generate the encoder data; and generating the domain specific dataset as a subset of the general-domain dataset.

Additional examples can involve accessing distilled encoder data, wherein the distilled encoder data is generated by filtering encoder data generated from a general-domain dataset that is not domain specific to generate filtered encoder data, and generating the distilled encoder data from the filtered encoder data using a domain specific training dataset; accessing a real-time stream of domain specific data; and processing the real-time stream of domain specific data using the distilled encoder data to generate task output data.

FIG. 11 an example shows a flowchart of a method 1100 in accordance with some aspects of the present technology. In some examples, method 1100 can be performed by a device, such as the device of FIG. 12 or any device described herein. In some examples, method 1100 can be instructions stored in a computer readable medium that, when executed by one or more processors of a device, cause the device to perform method 1100. In some examples, method 1000 can be combined with method 1100. In other examples, combinations of operations of method 1000 and 1100 can be merged with intervening or repeated operations, or with certain operations combined with any other operations described herein.

Method 1100 includes block 1102, which involves accessing distilled encoder data, wherein the distilled encoder data is generated by filtering encoder data generated from a general-domain dataset that is not domain specific to generate filtered encoder data, and generating the distilled encoder data from the filtered encoder data using a domain specific training dataset.

Method 1100 includes block 1104, which involves accessing a real-time stream of domain specific data. The real-time stream of data may be queries or NLP inputs associated with a particular domain associated with the domain specific training dataset. In some implementations, a domain specific training dataset may include aggregated domains that are smaller than the domain of the general-domain dataset, but that could be broken into multiple sub-domains. For example, a domain of "transportation" could be associated with a domain specific training dataset, while encompassing other domains of "cars", "boats", "planes", "trains", "motorcycles", etc. A domain of "computer repair" may similarly encompass a wide variety of sub-domains associated with different computer failure mechanisms.

Method 1100 includes block 1106, which involves processing the real-time stream of domain specific data using the distilled encoder data to generate task output data. The processing can include submitting strings of data from the real-time stream of domain specific data (e.g., sets of characters, including word groups, sentences, search modifiers, etc.) to an AI computing machine or NLP AI system, and providing a system output to a user or to other AI systems for further refining or processing. As described herein, such real-time accessing and real-time processing involves inputs to devices, and processing or network delays that occur as the data is analyzed. Such real-time aspects of an operation do not mean that the operations or elements of the operations are instantaneous, but that the operations occur as processed and communicated by devices in a networked system, with associated dynamic delays.

In some implementations, domain specific details in sources used to create the general-domain dataset can be dynamically tracked to identify changes associated with the domain specific dataset after creation of the distilled encoder data to identify when updates to the distilled encoder data are needed. For example, as databases and records used to derive a general-domain dataset are created, a monitoring system can track domain specific changes for threshold triggers or significant semantic shifts that may impact domain specific NLP. Such tracking may be done in real-time, or may be done periodically. In some implementations, updates to a general NLP AI system can be analyzed for changes impacting the domain specific data used to derive the distilled encoder data. Minor changes may be used to confirm that no update to the distilled encoder data is needed. Changes in the general NLP AI system determined to have an impact on domain specific results in more than a threshold fraction of task outputs may be used as an automatic trigger for creation of updated distilled encoder data. Such analysis may be integrated into automated systems for updating the distilled encoder data that can be dynamically and automatically performed in response to real-time or periodic analysis of source data changes.

For example, a domain targeted for a domain specific encoder may be technical support for a website selling a set of products. Such a domain can include sub-domains of both website technical support, technical support for the various products and/or subsets of products, and sales support for the various products for sale. A general-domain dataset can be filtered (e.g., analyzed to separate out domain-specific data) to generate filtered encoder data relevant to the identified domain for the website. The filtered encoder data can then be trained to generate distilled encoder data. The encoder that uses the distilled encoder data can be tested to identify a difference between desired results and actual results, and tuning values can be used with the distilled encoder data to configure task outputs. During operational use of the tuned distilled encoder, a feedback system can track a difference between a desired result and an actual result. For example, responses to questions about a specific product that return a result for an incorrect product can be tuned using tuning values. Similarly, inputs known to be expecting a response for technical support that instead return sales support responses can be tuned by adjusting tuning values. Such feedback can be used in real-time to dynamically tune task outputs (e.g., responses to an input query). Such feedback adjustments can, in some instances, allow many users to simultaneously use a system, and the system operation to be adjusted for subsequent users who begin using the system while previous users, including users associated with the feedback, continue to use the system at the same time.

Additionally, while specific examples are described above, it will be apparent that additional examples are possible in accordance with the details described herein. For example, the operations described above can be repeated or can include additional intervening operations.

Figure 12:
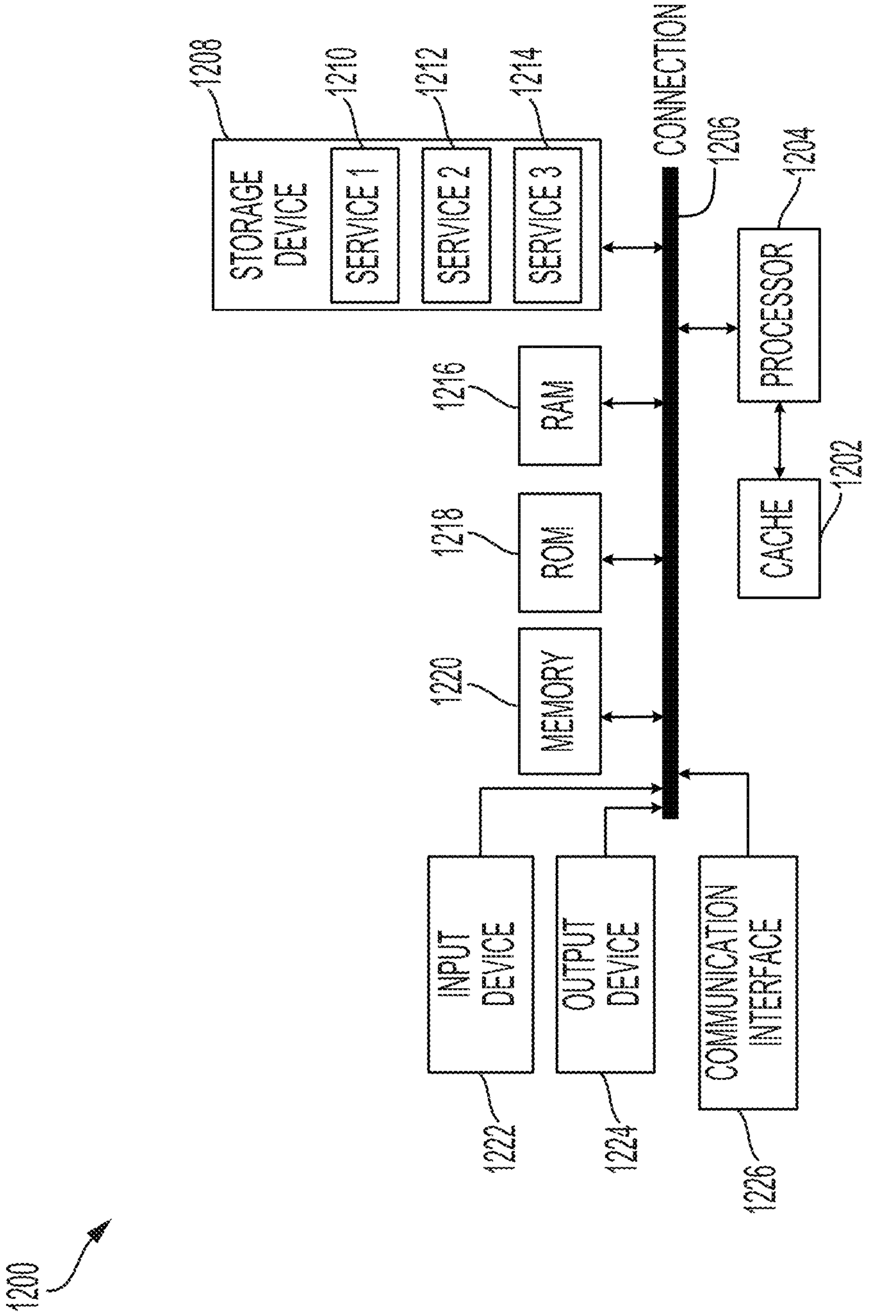
FIG. 12 illustrates an example computing device that can be used to implement aspects of an intent driven communication systems in accordance with some implementations of the present technology.

FIG. 12 illustrates a computing system architecture 1200 including various components in electrical communication with each other using a connection 1206, such as a bus, in accordance with some implementations. Example system architecture 1200 includes a processing unit (CPU or processor) 1204 and a system connection 1206 that couples various system components including the system memory 1220, such as ROM 1218 and RAM 1216, to the processor 1204. The system architecture 1200 can include a cache 1202 of high-speed memory connected directly with, in close proximity to, or integrated as part of the processor 1204. The system architecture 1200 can copy data from the memory 1220 and/or the storage device 1208 to the cache 1202 for quick access by the processor 1204. In this way, the cache can provide a performance boost that avoids processor 1204 delays while waiting for data. These and other modules can control or be configured to control the processor 1204 to perform various actions.

Other system memory 1220 may be available for use as well. The memory 1220 can include multiple different types of memory with different performance characteristics. The processor 1204 can include any general purpose processor and a hardware or software service, such as service 1 1210, service 2 1212, and service 3 1214 stored in storage device 1208, configured to control the processor 1204 as well as a special-purpose processor where software instructions are incorporated into the actual processor design. The processor 1204 may be a completely self-contained computing system, containing multiple cores or processors, a bus, memory controller, cache, etc. A multi-core processor may be symmetric or asymmetric.

To enable user communication with the computing system architecture 1200, an input device 1222 can represent any number of input mechanisms, such as a microphone for speech, a touch-sensitive screen for gesture or graphical input, keyboard, mouse, motion input, speech and so forth. An output device 1224 can also be one or more of a number of output mechanisms known to those of skill in the art. In some instances, multimodal systems can enable a user to provide multiple types of input to communicate with the computing system architecture 1200. The communications interface 1226 can generally govern and control the user input and system output. There is no restriction on operating on any particular hardware arrangement and therefore the basic features here may easily be substituted for improved hardware or firmware arrangements as they are developed.

Storage device 1208 is a non-volatile memory and can be a hard disk or other types of computer readable media which can store data that are accessible by a computer, such as magnetic cassettes, flash memory cards, solid state memory devices, digital versatile disks, cartridges, RAMs 1216, ROM 1218, and hybrids thereof.

The storage device 1208 can include services 1210, 1212, 1214 for controlling the processor 1204. Other hardware or software modules are contemplated. The storage device 1208 can be connected to the system connection 1206. In one aspect, a hardware module that performs a particular function can include the software component stored in a computer-readable medium in connection with the necessary hardware components, such as the processor 1204, connection 1206, output device 1224, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form. As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform as events occur or in batch mode aggregating multiple events, such as over one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file routing system, such as a disk operating system. One example of operating system software with associated file routing system software is the family of operating systems known as Windows® from Microsoft Corporation of Redmond, WA, and their associated file routing systems. Another example of operating system software with its associated file routing system software is the Linux™ operating system and its associated file routing system. The file routing system can be stored in the non-volatile memory and/or drive unit and can cause the processor to execute the various acts involved by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless ally stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The involved structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

In general, the routines executed to implement the implementations of the disclosure, may be implemented as part of an operating system or an application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may include a transformation, such as a physical transformation. Rather, the foregoing is intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any characteristics, features, or aspects of the disclosure with which that terminology is associated. In general, the terms used in the following claims should not be construed to limit the disclosure to the implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object including a computer-readable medium containing computer program code, which can be executed by a computer processor for performing any or all of the steps, operations, or processes described.

Examples may also relate to an apparatus for performing the operations herein. This apparatus may be specially constructed for the involved purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may include information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

details were given in the preceding description to provide a thorough understanding of various implementations of systems and components for a contextual connection system. It will be understood by one of ordinary skill in the art, however, that the implementations described above may be practiced without these details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The program code may be executed by a processor, which may include one or more processors, such as one or more digital signal processors (DSPs), general purpose microprocessors, an application integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing detailed description of the technology has been presented for purposes of illustration and description. It is not intended to be exhaustive or to limit the technology to the precise form disclosed. Many modifications and variations are possible in light of the above teaching. The described examples were chosen in order to best explain the principles of the technology, its practical application, and to enable others skilled in the art to utilize the technology in various examples and with various modifications as are suited to the particular use contemplated. It is intended that the scope of the technology be defined by the claim.

What is claimed is:

1. A computer-implemented method comprising:
accessing natural language processing (NLP) general encoder data, wherein the NLP general encoder data is generated from a general-domain dataset that is not domain specific, and wherein the NLP general encoder data includes layers;
generating filtered encoder data by removing a subset of the layers of the NLP general encoder data;
training the filtered encoder data using a domain specific dataset to generate distilled encoder data; and
analyzing, using the distilled encoder data, datasets for domain specific NLP.

2. The computer-implemented method of claim 1, wherein training the filtered encoder data using the domain specific dataset includes training the filtered encoder data using a masked language model.

3. The computer-implemented method of claim 1, wherein the domain specific dataset is smaller than a threshold size, and the threshold size is smaller than the general-domain dataset.

4. The computer-implemented method of claim 1, further comprising:
updating the domain specific dataset using a real-time stream of domain specific data; and
generating updated distilled encoder data by retraining the filtered encoder data using the updated domain specific dataset.

5. The computer-implemented method of claim 4, further comprising:
generating performance metrics for the distilled encoder data and the updated distilled encoder data; and
selecting between the distilled encoder data and the updated distilled encoder data based on the performance metrics.

6. The computer-implemented method of claim 1, wherein the distilled encoder data is configured to identify categories associated with labels of the domain specific dataset.

7. The computer-implemented method of claim 1, wherein the distilled encoder data is configured to identify real-time data in a two-way communication associated with an actionable request.

8. The computer-implemented method of claim 1, wherein training the filtered encoder data using the domain specific dataset includes performing dynamic masking with randomly selected words in the domain specific dataset in sufficient quantity to leverage gradient accumulation.

9. The computer-implemented method of claim 1, further comprising:
accessing the general-domain dataset used to generate the NLP general encoder data; and
generating the domain specific dataset as a subset of the general-domain dataset.

10. The computer-implemented method of claim 1, further comprising:
accessing the distilled encoder data;
accessing a real-time stream of domain specific data; and
processing the real-time stream of domain specific data using the distilled encoder data to generate task output data.

11. A device comprising:
a memory storing instructions; and
one or more processors coupled to the memory, the one or more processors configured by the instructions to perform operations comprising:
accessing natural language processing (NLP) general encoder data, wherein the NLP general encoder data is generated from a general-domain dataset that is not domain specific, and wherein the NLP general encoder data includes layers;
generating filtered encoder data by removing a subset of the layers of the NLP general encoder data;
training the filtered encoder data using a domain specific dataset to generate distilled encoder data; and
analyzing, using the distilled encoder data, datasets for domain specific NLP.

12. The device of claim 11, wherein training the filtered encoder data using the domain specific dataset includes training the filtered encoder data using a masked language model.

13. The device of claim 11, wherein the domain specific dataset is smaller than a threshold size, and the threshold size is smaller than the general-domain dataset.

14. The device of claim 11, wherein the one or more processors are further configured by the instructions to perform operations comprising:
updating the domain specific dataset using a real-time stream of domain specific data; and
generating updated distilled encoder data by retraining the filtered encoder data using the updated domain specific dataset.

15. The device of claim 14, wherein the one or more processors are further configured by the instructions to perform operations comprising:
generating performance metrics for the distilled encoder data and the updated distilled encoder data; and
selecting between the distilled encoder data and the updated distilled encoder data based on the performance metrics.

16. A non-transitory computer readable storage medium comprising instructions that, when executed by one or more processors of a device, cause the device to perform operations comprising:
accessing natural language processing (NLP) general encoder data, wherein the NLP general encoder data is generated from a general-domain dataset that is not domain specific, and wherein the NLP general encoder data includes layers;
generating filtered encoder data by removing a subset of the layers of the NLP general encoder data;
training the filtered encoder data using a domain specific dataset to generate distilled encoder data; and
analyzing, using the distilled encoder data, datasets for domain specific NLP.

17. The non-transitory computer readable storage medium of claim 16, wherein training the filtered encoder data using the domain specific dataset includes training the filtered encoder data using a masked language model.

18. The non-transitory computer readable storage medium of claim 16, wherein the domain specific dataset is smaller than a threshold size, and the threshold size is smaller than the general-domain dataset.

19. The non-transitory computer readable storage medium of claim 16, wherein when executed by the one or more processors, the instructions cause the device to perform additional operations comprising:
updating the domain specific dataset using a real-time stream of domain specific data; and generating updated distilled encoder data by retraining the filtered encoder data using the updated domain specific dataset.

20. The non-transitory computer readable storage medium of claim 19, wherein when executed by the one or more processors, the instructions cause the device to perform additional operations comprising:

generating performance metrics for the distilled encoder data and the updated distilled encoder data; and selecting between the distilled encoder data and the updated distilled encoder data based on the performance metrics.

* * * * *